(12) United States Patent
Hwang et al.

(10) Patent No.: US 11,245,440 B2
(45) Date of Patent: Feb. 8, 2022

(54) METHOD FOR PERFORMING MEASUREMENT AND WIRELESS COMMUNICATION DEVICE

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/046,278

(22) PCT Filed: Jun. 4, 2019

(86) PCT No.: PCT/KR2019/006757
§ 371 (c)(1),
(2) Date: Oct. 8, 2020

(87) PCT Pub. No.: WO2019/245199
PCT Pub. Date: Dec. 26, 2019

(65) Prior Publication Data
US 2021/0083730 A1    Mar. 18, 2021

(30) Foreign Application Priority Data

Jun. 22, 2018 (KR) .................. 10-2018-0072210
Jun. 22, 2018 (KR) .................. 10-2018-0072227

(51) Int. Cl.
*H04B 7/0408* (2017.01)
*H04W 72/00* (2009.01)
(Continued)

(52) U.S. Cl.
CPC ......... *H04B 7/0408* (2013.01); *H04B 7/0626* (2013.01); *H04L 1/0003* (2013.01);
(Continued)

(58) Field of Classification Search
CPC ..... H04W 72/00; H04W 72/02; H04W 72/04; H04L 5/0051; H04L 5/0092;
(Continued)

(56) References Cited

U.S. PATENT DOCUMENTS

2017/0303220 A1    10/2017  Sadeghi et al.
2019/0200249 A1*   6/2019   Yoon .................. H04L 5/0057
(Continued)

FOREIGN PATENT DOCUMENTS

WO    2018/031975    2/2018

OTHER PUBLICATIONS

PCT International Application No. PCT/KR2019/006757, International Search Report dated Sep. 6, 2019, 2 pages.
(Continued)

*Primary Examiner* — Phong La
(74) *Attorney, Agent, or Firm* — Lee, Hong, Degerman, Kang & Waimey PC

(57) ABSTRACT

A disclosure of the present specification provides a method for performing measurement by a wireless communication device. The method may comprise the steps of: receiving a synchronization signal (SS)/physical broadcast channel (PBCH) block (SSB) from a serving cell in a first period by using a first number of reception beams; performing measurement on the basis of the received SSB; and receiving downlink data from the serving cell in a second period by using a second number of reception beams, wherein the first period and the second period are included in an SS-based measurement timing configuration (SMTC) window duration, and the downlink data is considered not to be trans-
(Continued)

mitted during a third period in which the number of the reception beams is changed from the first number to the second number or is changed from the second number to the first number.

20 Claims, 24 Drawing Sheets

(51) Int. Cl.
| | | |
|---|---|---|
| *H04B 7/06* | (2006.01) | |
| *H04L 1/00* | (2006.01) | |
| *H04L 5/00* | (2006.01) | |
| *H04W 56/00* | (2009.01) | |

(52) U.S. Cl.
CPC .......... *H04L 5/0051* (2013.01); *H04L 5/0092* (2013.01); *H04W 56/001* (2013.01); *H04W 72/005* (2013.01)

(58) Field of Classification Search
CPC ... H04L 5/0091; H04L 5/0094; H04L 5/0096; H04L 5/0048; H04L 5/005; H04L 1/0003; H04L 1/0001; H04L 1/0002; H04B 7/0626; H04B 7/0621; H04B 7/0628; H04B 7/0632; H04B 7/0634; H04B 7/0408; H04B 7/0404
See application file for complete search history.

(56) References Cited

U.S. PATENT DOCUMENTS

| | | | |
|---|---|---|---|
| 2020/0092740 A1* | 3/2020 | Yokomakura | H04W 24/10 |
| 2020/0100219 A1* | 3/2020 | Takeda | H04L 5/0053 |
| 2020/0127879 A1* | 4/2020 | Yokomakura | H04W 48/12 |
| 2020/0220680 A1* | 7/2020 | Yamada | H04W 72/042 |
| 2020/0389885 A1* | 12/2020 | Tomeba | H04W 88/02 |
| 2021/0045076 A1* | 2/2021 | Tomeba | H04B 7/0617 |
| 2021/0234646 A1* | 7/2021 | Koskela | H04L 5/0048 |

OTHER PUBLICATIONS

ZTE, "Remaining details of RRM measurements," 3GPP TSG RAN WG1 Meeting #93, R1-1805946, Busan, Korea, May 21-25, 2018, 9 pages.
OPPO, "Remaining details on NR RRM," 3GPP TSG RAN WG1 Meeting #93, R1-1806869, Busan, Korea, May 21-25, 2018, 6 pages.
Intel Corporation, "Summary of Offline Discussion for NR RRM measurements," 3GPP TSG RAN WG1 Meeting #93, R1-1807852, Busan, Korea, May 21-25, 2018, 14 pages.
Section 7.4.1.5.2 of 3GPP TS 38.211 V15.1.0 (Mar. 2018); TS; 3GPP; TSGRAN; NR; Physical channels and modulation; (Release 15); 4 pages.
Section 7.4.1.5.3 of 3GPP TS 38.211 v15.1.0 (Mar. 2018); TS; 3GPP; TSGRAN; NR; Physical channels and modulation; (Release 15); 7 pages.

* cited by examiner

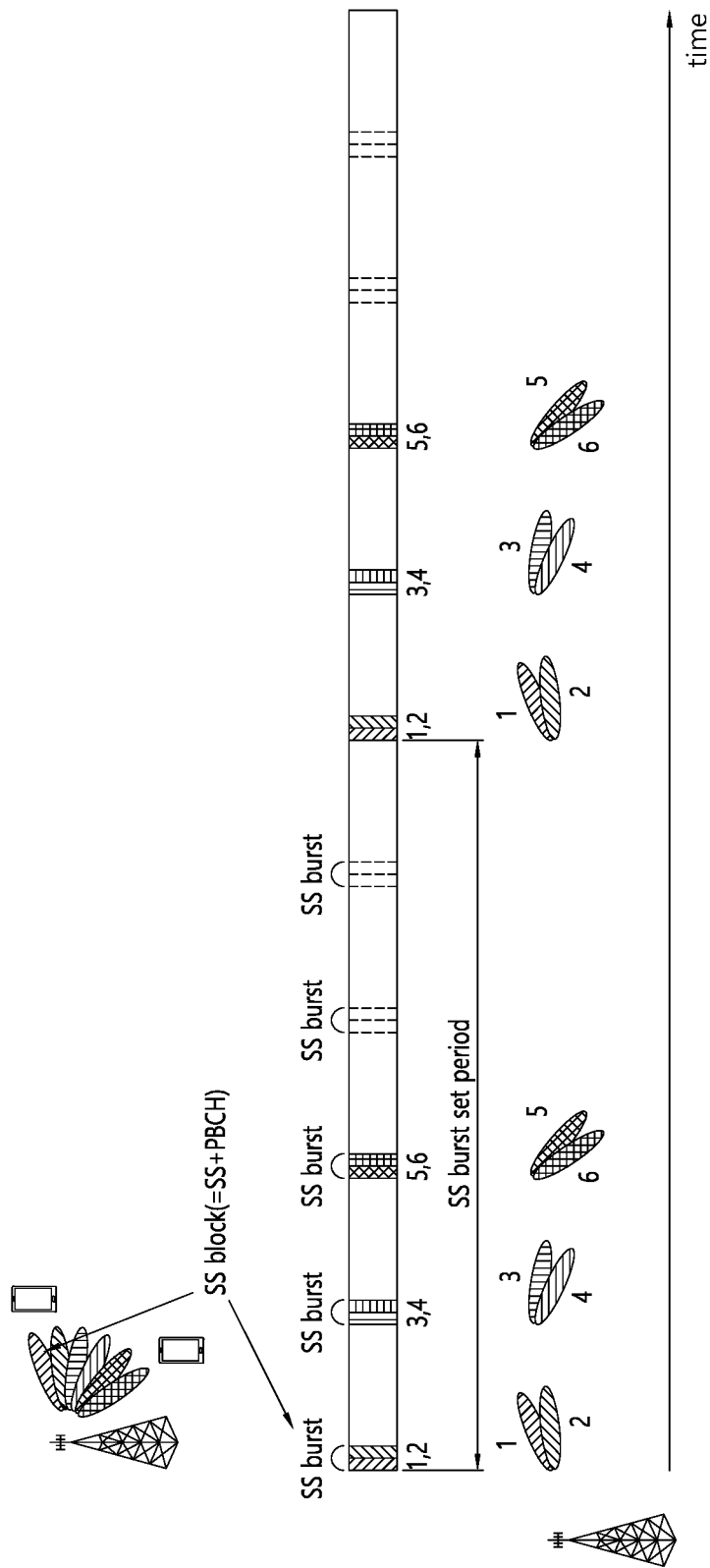

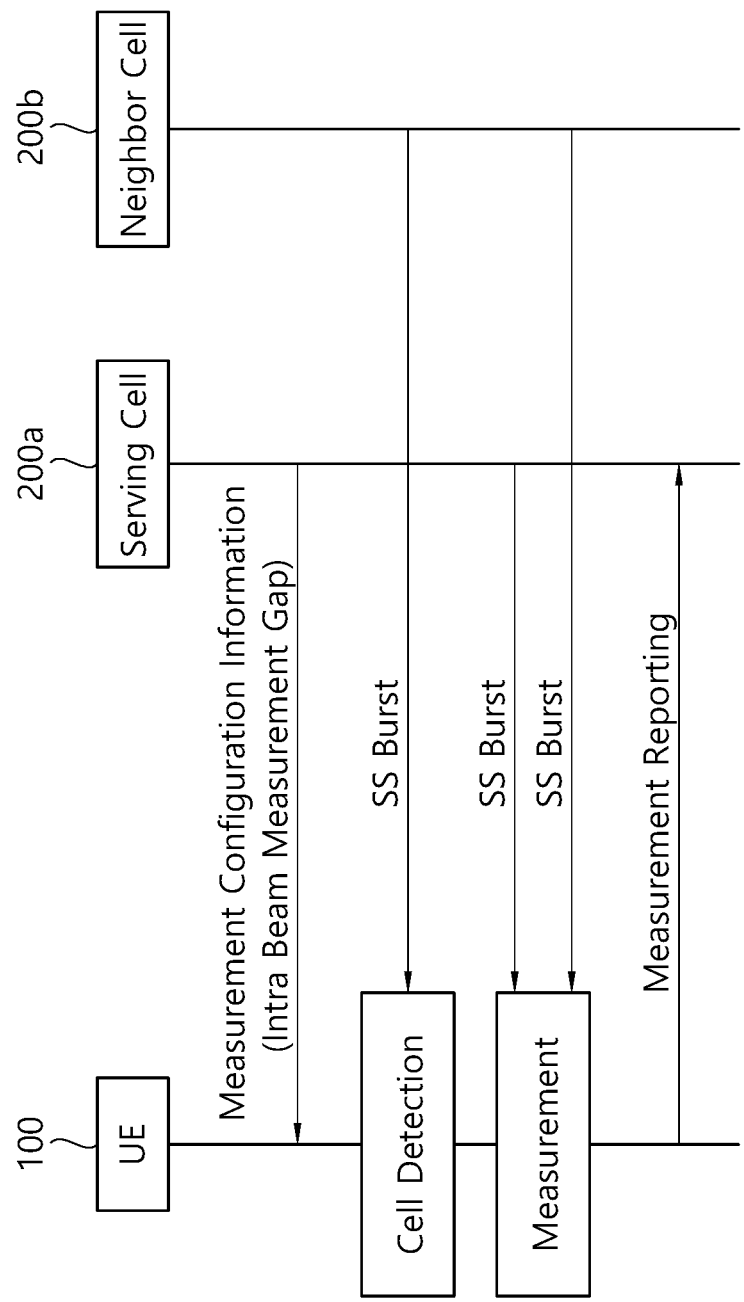

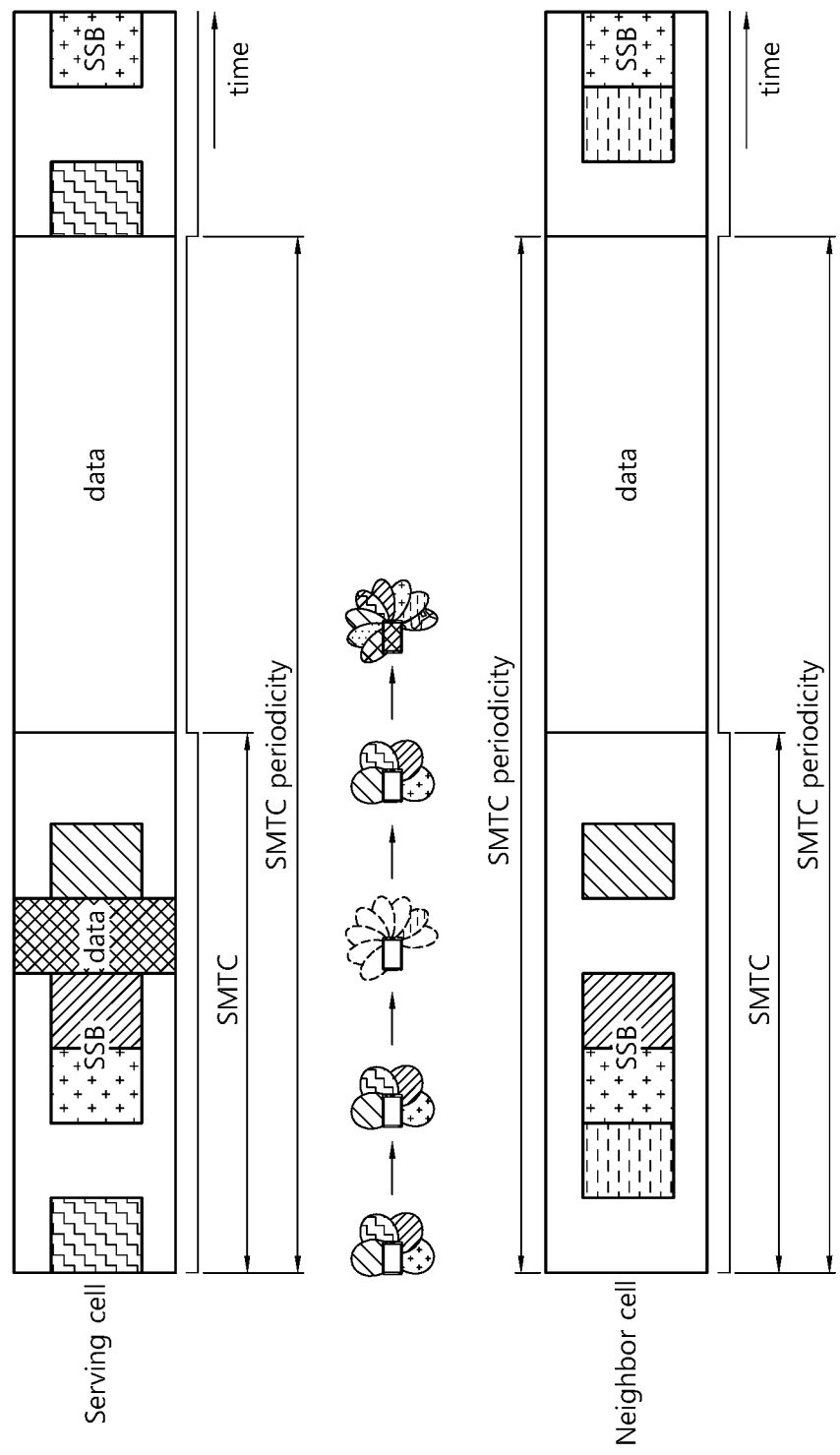

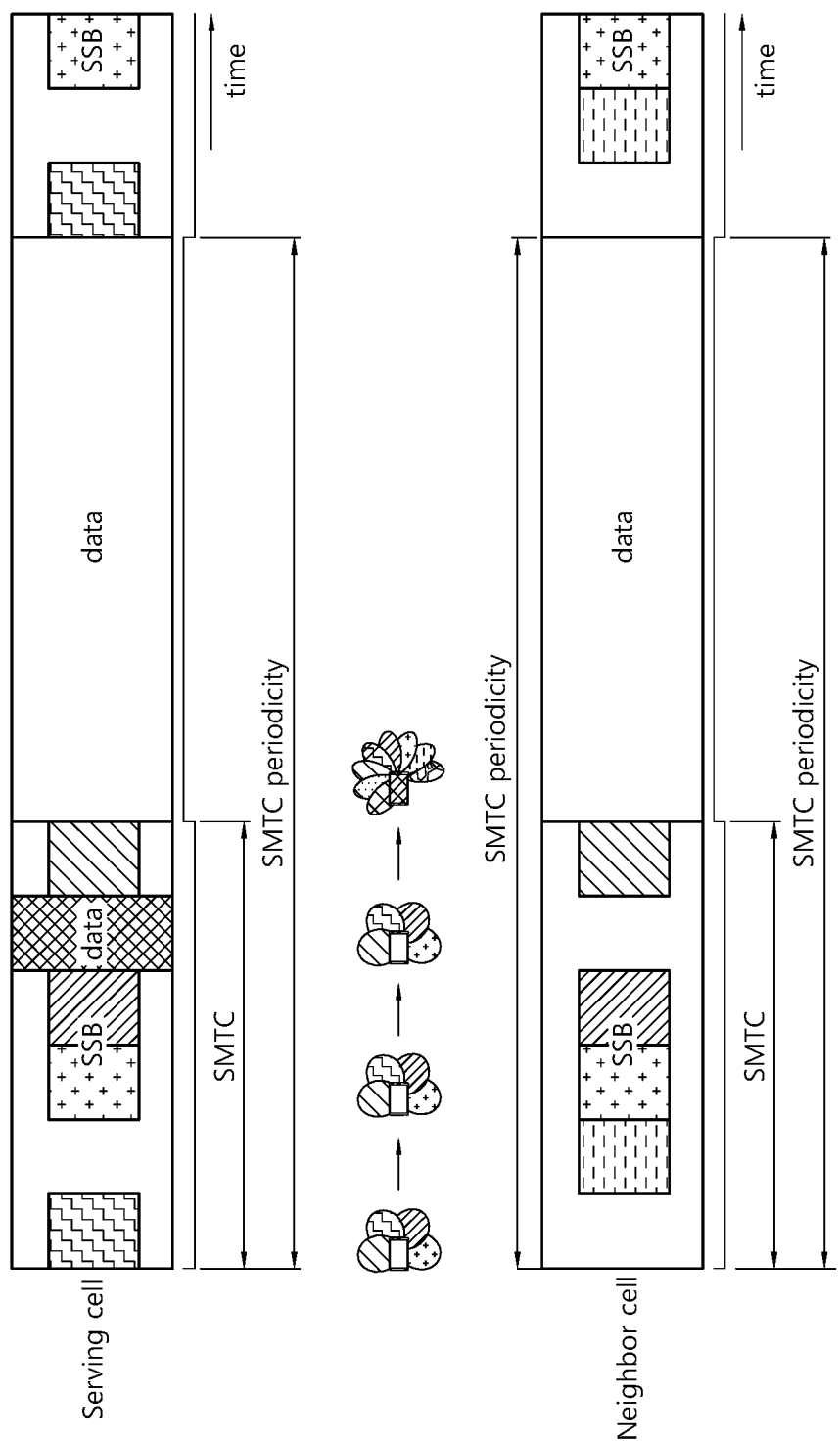

METHOD FOR PERFORMING MEASUREMENT AND WIRELESS COMMUNICATION DEVICE

CROSS-REFERENCE TO RELATED APPLICATIONS

This application is the National Stage filing under 35 U.S.C. 371 of International Application No. PCT/KR2019/006757, filed on Jun. 4, 2019, which claims the benefit of earlier filing date and right of priority to Korean Application Nos. 10-2018-0072210, filed on Jun. 22, 2018, and 10-2018-0072227, filed on Jun. 22, 2018, the contents of which are all hereby incorporated by reference herein in their entirety.

BACKGROUND OF THE DISCLOSURE

Field of the Disclosure

The present specification relates to next generation mobile communication.

Discussion of the Related Art

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

In NR, an operating band is divided into frequency range 1 (FR1) and frequency range 2 (FR2). FR1 band means a frequency band of equal to or less than 6 GHz and FR2 band means a frequency band exceeding 6 GHz.

User equipment (UE) operating in FR1, that is, FR1 UE, performs uplink signal transmission and downlink signal reception using an omnidirectional beam as in LTE.

On the other hand, a UE operating in FR2, that is, FR2 UE (mmWave NR UE) may perform uplink signal transmission and downlink signal reception using multiple beams through a beamforming operation to improve transmission/reception performance.

In FR2, the number of beams used by a UE affects radio link monitoring (RLM), cell identification time, and a measurement period. Settings with respect to the number of beams used by a UE are not defined in standards and may correspond to a terminal implementation issue. There are cases in which a serving cell transmits a data/control channel signal in a period in which a UE performs measurement (e.g., radio resource management (RRM) measurement). In such cases, UE operation for effectively receiving the data/control channel signal is not considered in the conventional technology. Specifically, there was no conventional method by which a UE receives downlink data (data in a data/control channel) when the downlink data is received from a serving cell within a time (e.g., an SSB based measurement timing configuration (SMTC) window duration) in which the UE performs measurement.

Meanwhile, in NR, measurement performed by a UE includes SSB based measurement and CSI-RS based measurement. In the case of CSI-RS based measurement, a UE may simultaneously receive DL data of a serving cell and a CSI-RS of a neighbor cell when the numerology of the DL data of the serving cell is the same as the numerology of the CSI-RS of the neighbor cell. However, when the numerology of the DL data of the serving cell is different from the numerology of the CSI-RS of the neighbor cell (e.g., subcarrier spacings are different from each other), the UE may not simultaneously receive the DL data of the serving cell and the CSI-RS of the neighbor cell according to UE capability. There was no conventional method of performing CSI-RS based measurement in consideration of UE capability when the numerology of the DL data of the serving cell is different from the numerology of the CSI-RS of the neighbor cell.

SUMMARY

Accordingly, disclosures of the specification are provided to solve the problems described above.

To accomplish the aforementioned object, one disclosure of the present specification provides a method for performing measurement by a wireless communication device. The method includes: receiving, from a serving cell, a synchronization signal (SS)/physical broadcast channel (PBCH) block (SSB) in a first interval by using a first number of reception (Rx) beams; performing measurement based on the received SSB; and receiving, from the serving cell, downlink data in a second interval by using a second number of Rx beams, wherein the first interval and the second interval are included in an SSB based measurement timing configuration (SMTC) window duration, and wherein the downlink data is considered to be not transmitted during a third interval in which the number of Rx beams is changed from the first number to the second number or changed from the second number to the first number.

To accomplish the aforementioned object, one disclosure of the present specification provides a wireless communication device performing measurement. The wireless communication device includes: a transceiver; and a processor for controlling the transceiver, wherein the processor is configured: to receive, from a serving cell, a synchronization signal (SS)/physical broadcast channel (PBCH) block (SSB) in a first interval by using a first number of reception (Rx) beams by controlling the transceiver; to perform measurement based on the received SSB; and to receive, from the serving cell, downlink data in a second interval by using a second number of Rx beams by controlling the transceiver, wherein the first interval and the second interval are included in an SSB based measurement timing configuration (SMTC) window duration, and wherein the downlink data is considered to be not transmitted in a third interval in which the number of Rx beams is changed from the first number to the second number or changed from the second number to the first number.

To accomplish the aforementioned object, one disclosure of the present specification provides a processor of a wireless communication device. The processor controls the wireless communication device, and the processor is configured: to receive, from a serving cell, a synchronization signal (SS)/physical broadcast channel (PBCH) block (SSB) in a first interval by using a first number of reception (Rx) beams by controlling the transceiver; to perform measurement based on the received SSB; and to receive, from the serving cell, downlink data in a second interval by using a second number of Rx beams greater than the first number, wherein the first interval and the second interval are included in an SSB based measurement timing configuration (SMTC) window duration, and wherein the downlink data is considered to be not transmitted in a third interval in which the number of Rx beams is changed from the first number to the second number or changed from the second number to the first number.

Existing problems are solved by the disclosure of the specification.

BRIEF DESCRIPTION OF THE DRAWINGS

FIG. 7 illustrates an example of beam sweeping in NR.

FIG. 8 illustrate a procedure of measurement and measurement report considering an SS burst.

FIGS. 9A to 9C illustrate an example of an operation of a UE according to a first disclosure of the present specification.

DESCRIPTION OF EXEMPLARY EMBODIMENTS

Figure 1:
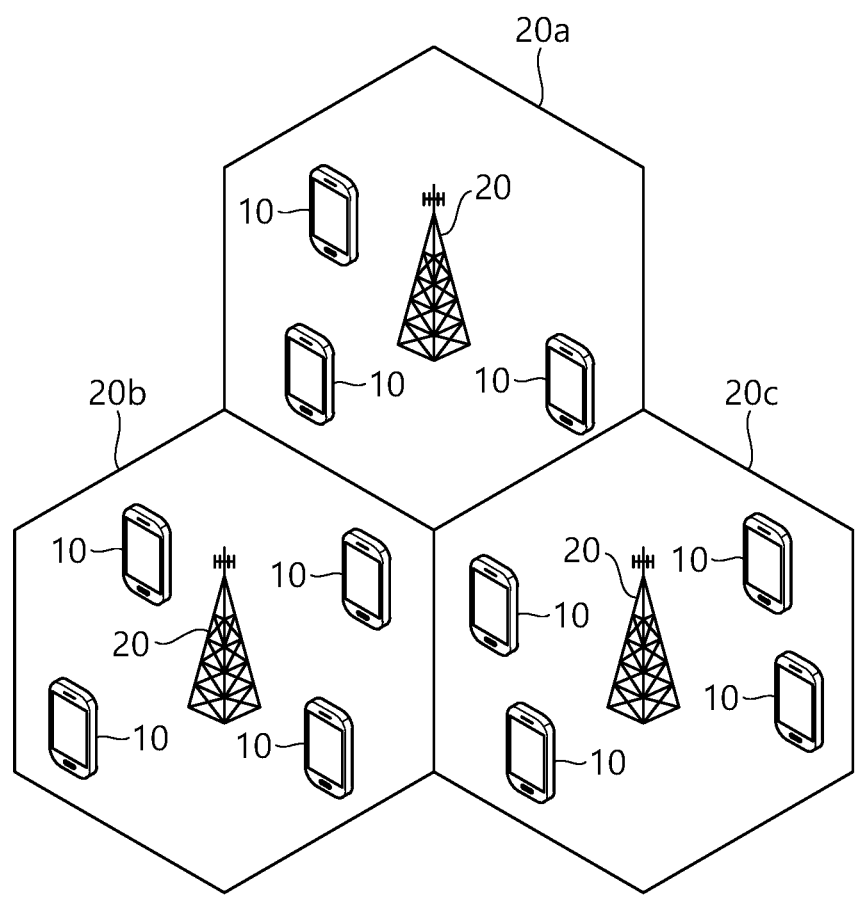
FIG. 1 is a wireless communication system.

Hereinafter, based on 3rd Generation Partnership Project (3GPP) long term evolution (LTE), 3GPP LTE-advanced (LTE-A), or 3GPP NR (New RAT) the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 is a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (Pcell) based on a CRS. This is so called Radio Link Monitoring (RLM).

Figure 2:
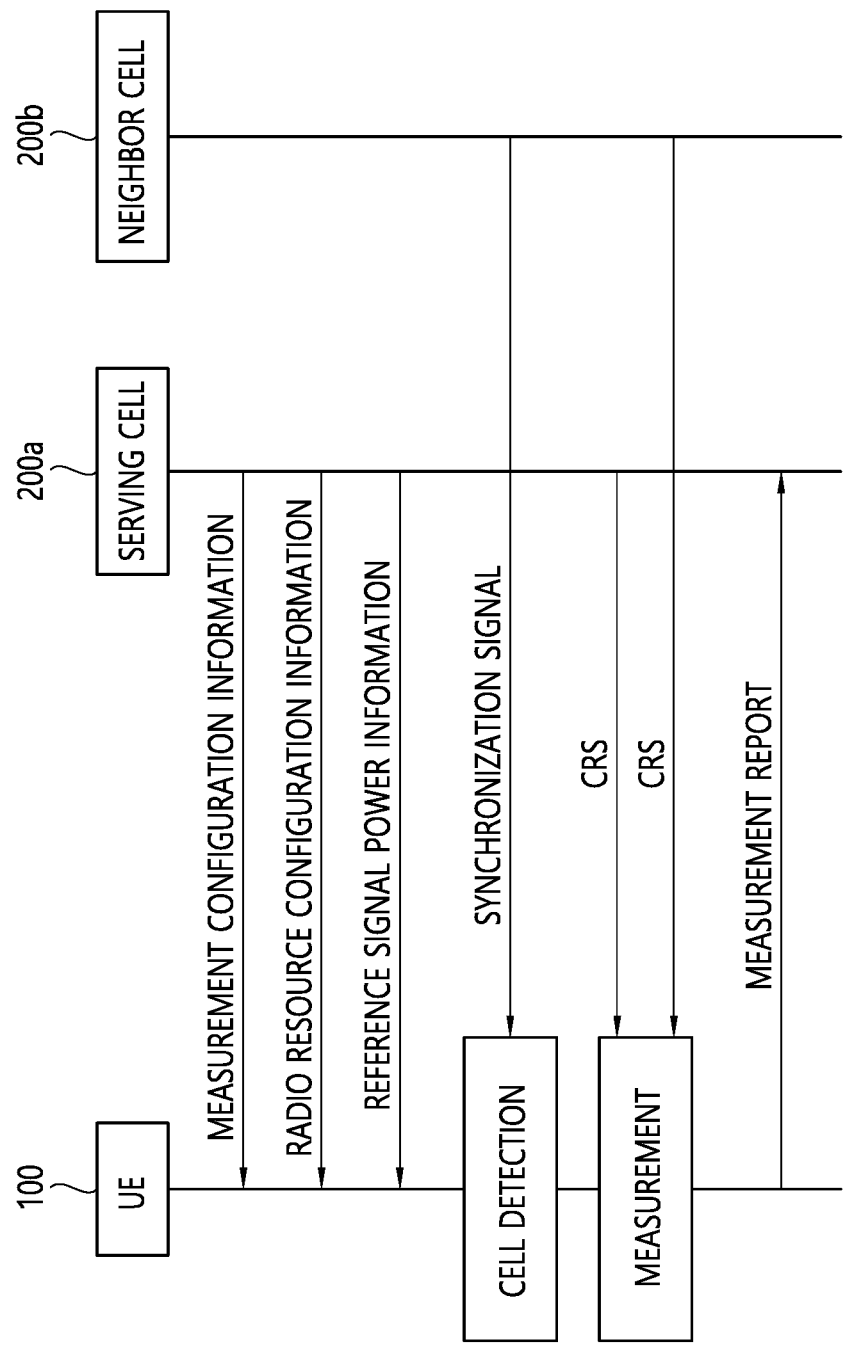
FIG. 2 illustrates a procedure for cell detection and measurement.

FIG. 2 shows a procedure for cell detection and measurement.

Referring to FIG. 2, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200a and the neighbor cell respectively transmit Cell-specific Reference Signals (CRSs), the UE 100 measures the CRSs and transmits a result of the measurement to the serving cell 200a. In this case, the UE 100 may compare power of the received CRSs based on received information on a reference signal power.

At this point, the UE 100 may perform the measurement in the following three ways.

1) RSRP (reference signal received power): This represents an average reception power of all REs that carry the CRS which is transmitted through the whole bands. In this case, instead of the CRS, an average reception power of all REs that carry the CSI RS may also be measured.

2) RSS (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100a for the measurement. The radio resource configuration information element (IE) is used to configure/modify/cancel a radio bearer or to modify an MAC configuration. The radio resource configuration IE includes subframe pattern information. The subframe pattern information is information on a measurement resource restriction pattern on the time domain, for measuring RSRP and RSRQ of a serving cell (e.g., PCell).

<Next-Generation Mobile Communication Network>

By success of LTE (long term evolution)/LTE-Advanced (LTE-A) for fourth-generation mobile communication, the next, that is, the fifth-(so-called 5G) mobile communication is increasingly interested and researches are continuously conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

<5G Usage Scenarios>

Figure 3:
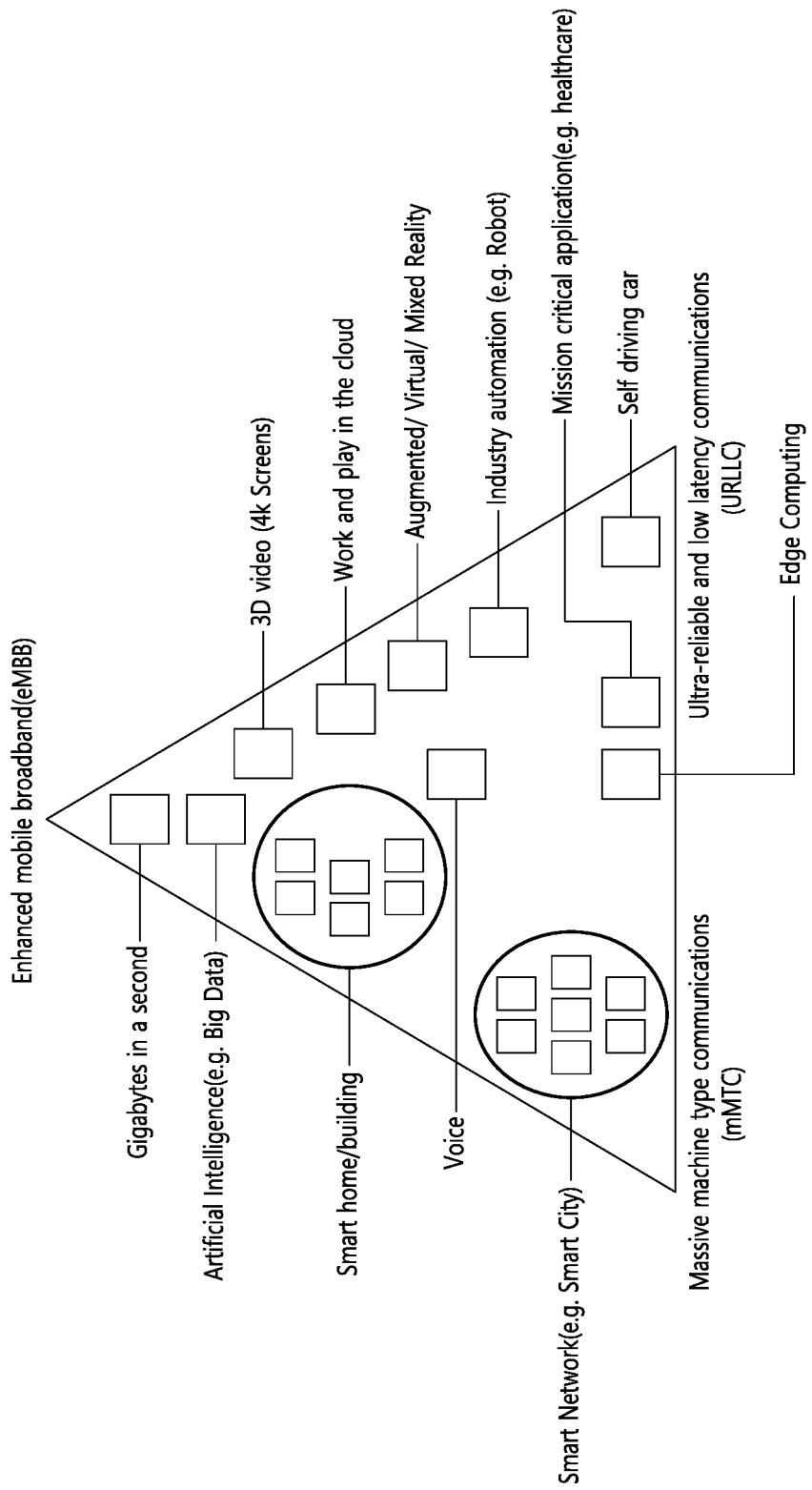
FIG. 3 is an exemplary diagram illustrating an example of an SS block in the NR.

FIG. 3 illustrates examples of 5G usage scenarios.

The 5G usage scenarios shown in FIG. 3 are only exemplary, and the technical features of the present specification can be applied to other 5G usage scenarios which are not shown in FIG. 2.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 4:
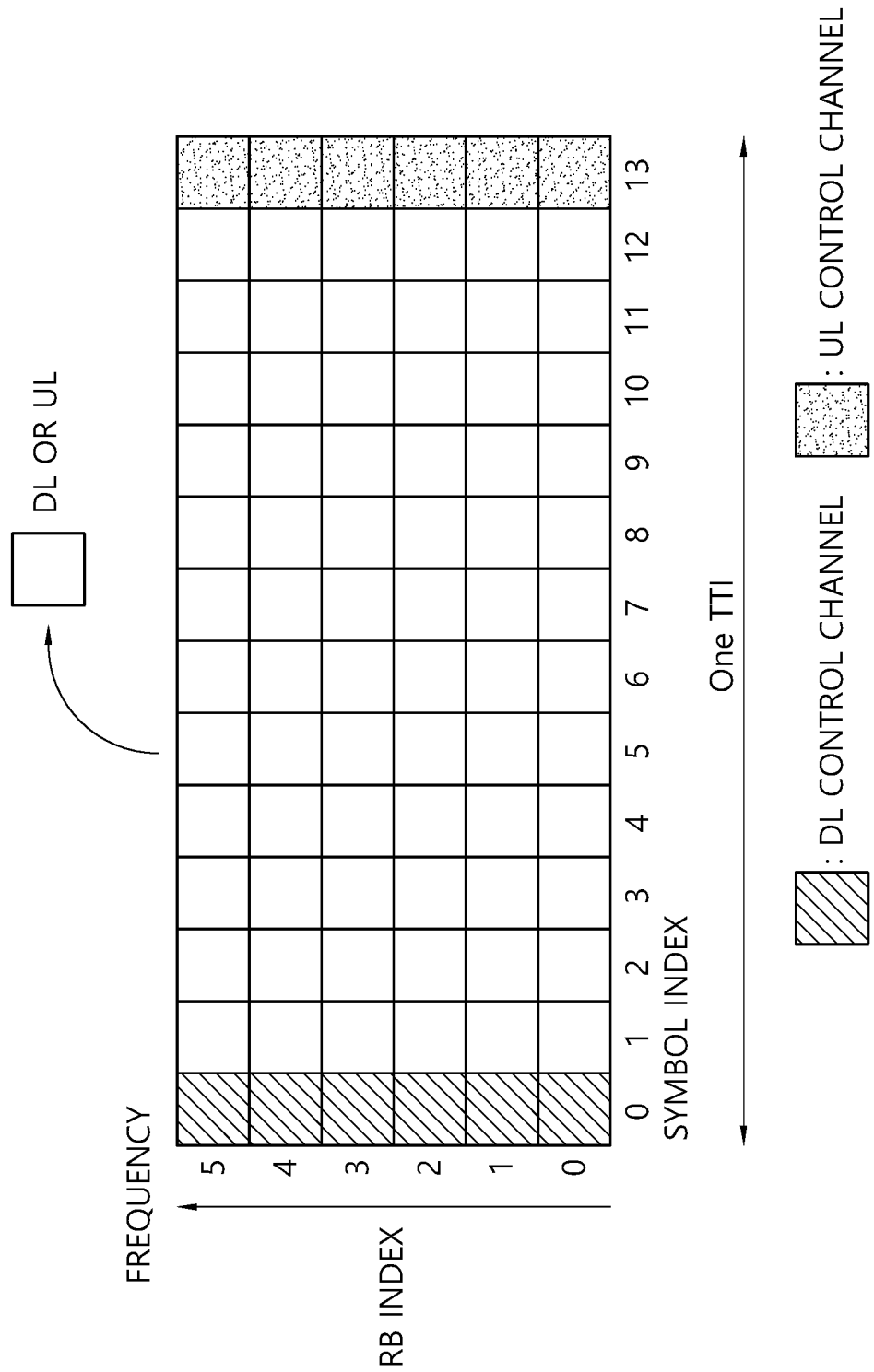
FIG. 4 illustrates an example of a subframe type in NR.

FIG. 4 shows an example of subframe type in NR.

A transmission time interval (TTI) shown in FIG. 4 may be called a subframe or slot for NR (or new RAT). The subframe (or slot) in FIG. 4 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for an uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and an uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols can be set to a guard period (GP).

Meanwhile, in NR, a downlink subframe may be used for reception from a base station and an uplink subframe may be used for transmission to the base station. This method may be applied to paired spectra and unpaired spectra. A pair of spectra means inclusion of two carrier spectra for downlink and uplink operation. For example, in a pair of spectra, one carrier may include a downlink band and an uplink band which are paired.

<Operating Band in NR>

An operating band is divided into frequency range 1 (FR1) band and frequency range 2 (FR2) band. FR1 band means a frequency band of equal to or less than 7.125 GHz and FR2 means a frequency band higher than 7.125 GHz. FR1 band and FR2 band are defined as shown in the following table 1.

TABLE 1

| Frequency band designation | Corresponding frequency range |
| --- | --- |
| Frequency Range 1 (FR 1) | 410 MHz-7125 MHz |
| Frequency Range 2 (FR 2) | 24250 MHz-52600 MHz |

Operating bands of the following table 2 are exemplary operating bands refarmed from operating bands of LTE/LTE-A and correspond to FR1 band.

TABLE 2

| NR operating band | Uplink (UL) operating band $F_{UL\_low}$-$F_{UL\_high}$ | Downlink (DL) operating band $F_{DL\_low}$-$F_{DL\_high}$ | Duplex mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table 3 shows NR operating bands defined at high frequencies which correspond to FR2 band.

TABLE 3

| NR operating band | Uplink (UL) operating band $F_{UL\_low}$-$F_{UL\_high}$ | Downlink (DL) operating band $F_{DL\_low}$-$F_{DL\_high}$ | Duplex mode |
| --- | --- | --- | --- |
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

Meanwhile, when the operating band shown in the above table is used, a channel bandwidth is used as shown in the following table.

TABLE 4

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table 4, SCS indicates a subcarrier spacing. In the above table, NRB indicates the number of RBs. Meanwhile, when the operating band shown in the above table is used, a channel bandwidth is used as shown in the following table.

TABLE 5

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<CSI-RS>

A CSI-RS is a CSI (Channel-State Information) reference signal. The CSI-RS is a reference signal that is used when a UE reports to a serving cells related to feedback of CSI.

CSI-RS may be composed of a combination of one or more CSI-RS configurations. A zero-power CSI-RS and non-zero-power CSI are defined.

For a non-zero-power CSI-RS, a sequence is created in accordance with 7.4.1.5.2 of 3GPP TS 38.211 and is mapped to a resource element in accordance with 7.4.1.5.3.

For the zero-power CSI-RS, a UE estimates that resource elements defined at 7.4.1.5.3 of 3GPP TS 38.211 are not transmitted to PDSCH and not perform any estimation on downlink transmission of the resource elements.

CSI-RS location in slot

1) Frequency location: The start subcarrier of a component RE pattern is as follows
  no limitation for 1 port CSI-RS.
  limited to one of even number of subcarriers for Y=2.
  limited to one of 0, 4, 8 for Y=4.
  where, Y is the gap of the start subcarrier.

2) (Time location): Transmitted from 5, 6, 7, 8, 9, 10, 12, 13 OFDM symbols.

Cycle

The following CSI-RS transmission cycle is supported a NR.

{5, 10, 20, 40, 80, 160, 320, 640} slots

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block.

In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 5A:
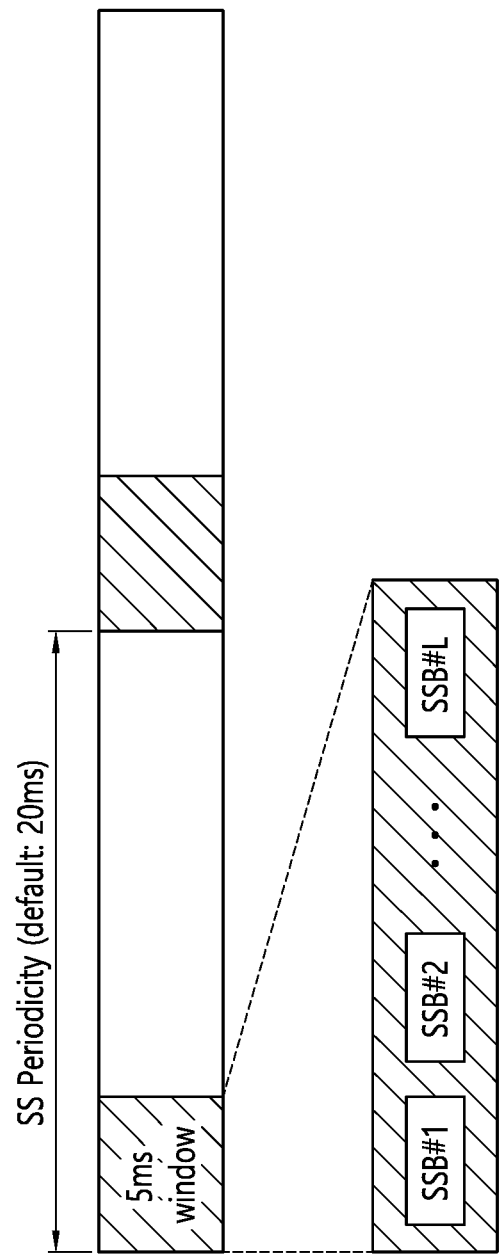
FIGS. 5A and 5B are exemplary diagrams illustrating the structure of an SSB at NR.
Figure 5B:
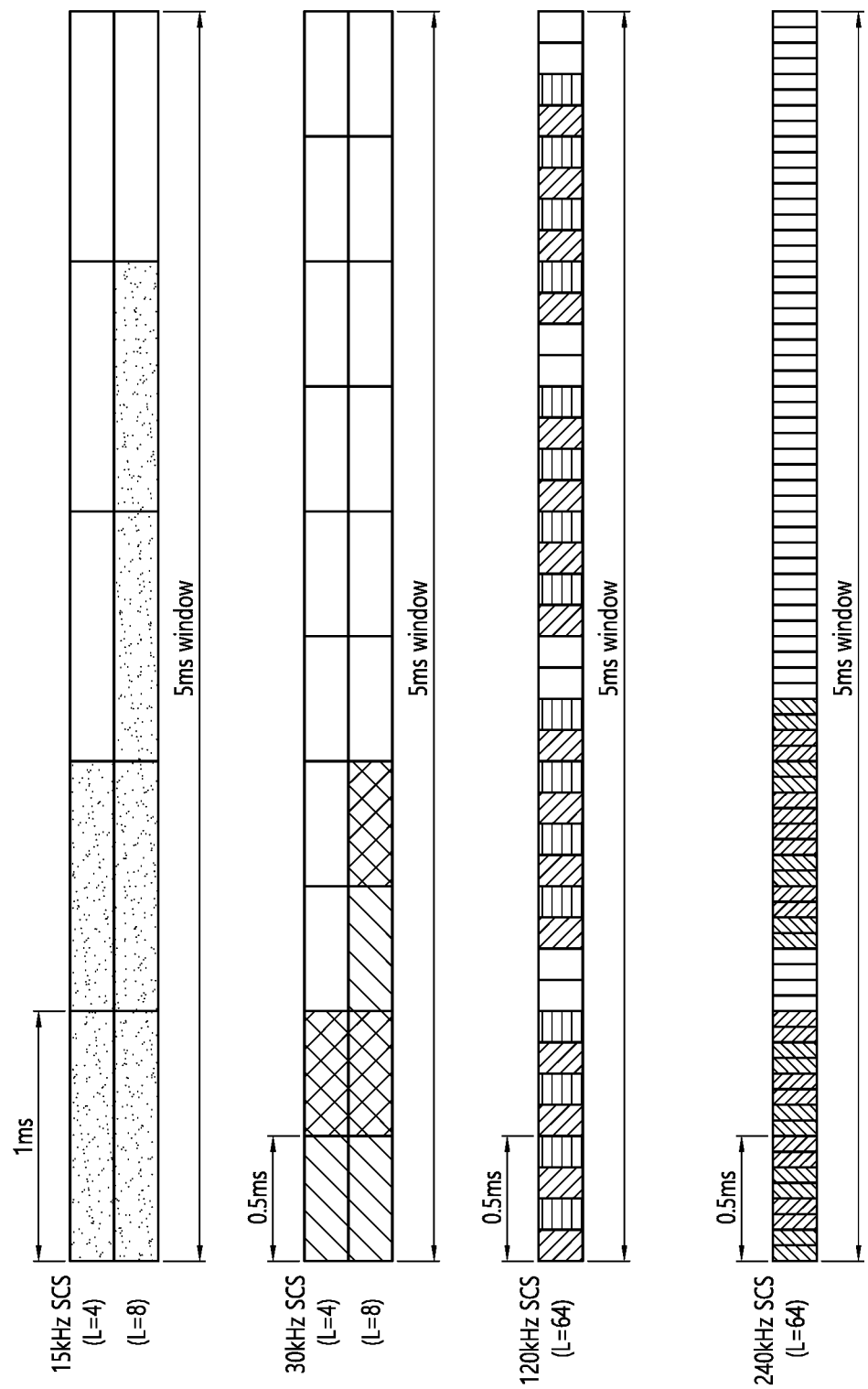

FIGS. 5A and 5B are Exemplary Diagrams Illustrating the Structure of an SSB at NR.

Referring to FIGS. 5A and 5B, SSBs may be transmitted into a window with a length of 5 ms regardless of the cycle of an SS burst set. The candidate number of the SSB that can be positioned in the 5 ms window may be L.

For various frequency bands, the maximum number L of SSBs in an SS burst set may be as the following examples (for reference, the minimum number of the SSB in the SS burst set is assumed as 1 to define performance requirement).

frequency band less than 3 GHz: L=4
frequency band of 3 GHz-6 GHZ: L=8
frequency band of 6 GHz 52.6 GHz: L=64

Further, as shown in FIG. 6A, an SSB cycle may be 20 ms. In detail, the default value for initial cell selection may be 20 ms. Further, the SSB cycle in RRC CONNECTED/RRC IDLE and NSA, for example, may be one of {5, 10, 20, 40, 80, 160} ms.

An example of an SSB configuration in a 5 ms window is shown in FIG. 6B. Referring to FIG. 6B, examples of SSB according to L in SCS (subcarrier spacing) and each SCS are shown in FIG. 6B. In FIG. 6B, two SSBs may be positioned in each colored area. For example, when L=4 in 15 kHz SCS, two SSBs are positioned in each of two colored areas, so a total of 4 SSBs can be transmitted from the 5 ms window. As another example, when L=64 in 240 kHz SCS, SSBs are respectively positions in 32 colored areas, so a total of 64 SSBs can be transmitted to the 5 ms window.

Time-Frequency Structure of an SS/PBCH Block

In a time domain, an SSB may be composed of 4 OFDMs. Here, the 4 OFDMs may be numbered from 0 to 3 in ascending order in the SSB. In the SSB, PSS, SSS, and PBCH (related with DM-RS) may use OFDM symbols.

In a frequency domain, an SSB may include 240 continuous subcarriers. Here, the subcarriers may be numbered from 0 to 239 in the SSB. k is a frequency index, 1 is assumed as a time index, and k and 1 may be defined in the SSB.

A UE may assume that the resource element designated by "set to 0" is set as 0 in the example of FIG. 14. A subcarrier 0 in the SSB may corresponds to a subcarrier $k_0$ of a common resource block $N_{CRB}^{SSB}$. Here, for $N_{CRB}^{SSB}$, the UE may be acquired by higher-layer signaling. For example, $N_{CRB}^{SSB}$ may be acquired from a higher-layer parameter offset-ref-low-scs-ref-PRB. A certain common resource block partially or fully overlapping the SSB may be viewed as occupied or may by viewed as being not transmitted to PDSCH or PDCCH. A resource element 0 that is a portion of common resources, which are not transmitted to the SSB but partially overlap the SSB, may be estimated as being set as 0.

For the SSB, the UE may estimate the followings.

Antenna port p-4000

CP and SCS with the same length may be used for PSS, SSS, and PBCH.

For a specific SSB type (e.g., SSB type A), ▮$k_0 \in \{0, 1, 2, \ldots, 23\}$, $\mu \in \{0, 1\}$ and $N_{CRB}^{SSB}$ may be expressed in unit of 15 kHz SCS.

For a specific SSB (e.g., SSB type B), $k_0 \in \{0, 1, 2, \ldots, 11\}$, $\mu \in \{3, 4\}$ and $N_{CRB}^{SSB}$ may be expressed in unit of 60 kHz SCS.

The UE may estimate that an SSB transmitted to the same block index is QCL (quasi co-located) for Doppler spread, Doppler shift, average gain, average delay, and spatial Rx parameters. The UE may not estimate that it is not QLC for other SSB transmission.

Figure 6:
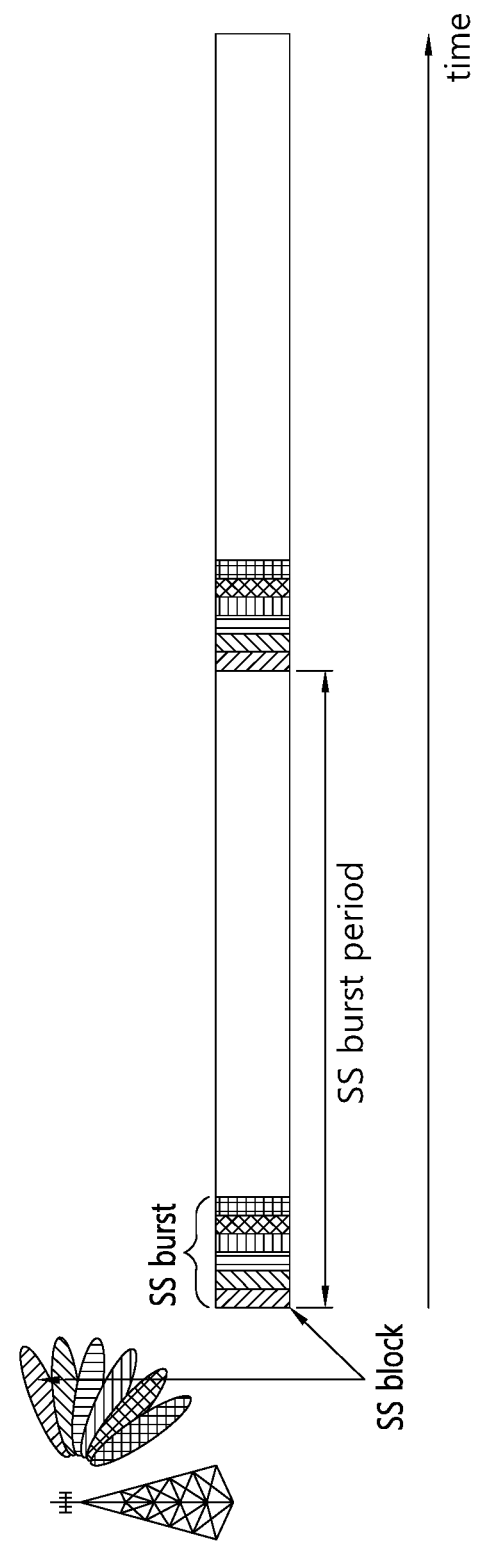
FIG. 6 illustrates an example of an SS block in NR.

FIG. 6 is a Diagram Illustrating an Example of an SS Block in NR.

Referring to FIG. 6, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 7.

FIG. 7 is a Diagram Illustrating an Example of Beam Sweeping in the NR.

A base station transmits each SS block in an SS burst over time while performing beam sweeping. In this case, multiple SS blocks in an SS burst set are transmitted to support UEs existing in different directions. In FIG. 7, the SS burst set includes one to six SS blocks, and each SS burst includes two SS blocks.

FIG. 8 Illustrates Measurement and a Measurement Report Procedure Considering an SS Burst.

As can be seen with reference to FIG. 8, a UE may receive measurement configuration information from a serving cell. The measurement configuration information may include information on a first measurement gap, e.g., an intra beam measurement gap. In addition, the measurement configuration information may include information on a second measurement gap, e.g., an intra RSRP measurement gap.

The UE may receive an SS burst from one or more neighbor cells to perform cell detection.

In addition, the UE may perform measurement based on the SS burst received from the one or more neighbor cells during a first measurement gap (e.g., an intra beam measurement gap) indicated by the information.

In addition, although not shown, the UE may perform RSRP measurement based on a reference signal (RS) from the one or more neighbor cells during the second measurement gap.

In addition, the UE may perform measurement reporting.

<Bandwidth Part: BWP>

A wideband frequency maximally reaching 400 MHz may be used in NR. A new concept of BWP was introduced in NR to enable various UEs to efficiently distribute and use a frequency band.

When UEs transmit the information about their abilities to a base station while performing initial access, the base station may configure a BWP to be used by the UEs to the UEs and may transmit the information about the configured BWP to the UE. Accordingly, downlink and uplink data transmission and reception between the UEs and the base station are performed only through the BWP configured in the UEs. That is, configuring the BWP in the UEs by the base station is to instruct the UEs not to use frequency bands other than the BWP when performing wireless communication with the base station later.

The base station may configure the entire band of the carrier frequency reaching 400 MHz as the BWP for the UEs or may configure only some bands as the BWP for the UEs. Further, the base station may configure several BWPs for one UE. When several BWPs are configured for one UE, the frequency bands of the BWPs may overlap each other or not.

<RRM Measurement>

The purpose of radio resource management (RRM) measurement (or layer 3 (L3) measurement) is to guarantee UE mobility (e.g., L3 mobility) by comparing a measurement result with respect to a serving cell with a measurement result with respect to a neighbor cell. A UE may measure RSRP, RSRQ or SINR based on a signal received from the serving cell and a signal received from the neighbor cell and report a measurement result to the serving cell. Then, the serving cell can determine execution of a procedure such as handover by comparing a measurement result with respect to the serving cell with a measurement result with respect to the neighbor cell and perform the procedure to guarantee UE mobility.

The UE may perform RRM measurement (SSB based RRM measurement) based on an SSB transmitted by the serving cell and an SSB transmitted by the neighbor cell. In addition, the UE may perform RRM measurement (CSI-RS based RRM measurement) based on a CSI-RS transmitted by the serving cell and a CSI-RS transmitted by the neighbor cell.

<Problems to be Solved by Disclosure of Present Specification>

I. First Problem

In FR2 band, the number of beams used by a UE affects radio link monitoring (RLM), cell identification time and a measurement period. Settings (or configuration) with respect to the number of beams used by a UE are not defined in standards and may correspond to a terminal implementation issue.

There are cases in which a serving cell (i.e., serving gNB (next generation NodeB)) transmits a data/control channel signal in a period in which a UE performs measurement (e.g., radio resource management (RRM) measurement). Further, there are cases in which a UE transmits a data/control channel signal to a serving cell in a period in which the UE performs measurement. In such cases, a method for effectively transmitting or receiving a data/control channel signal was not considered in the conventional technology.

Specifically, conventionally there was no method for UE to receive or transmit data, when downlink data (data in a data/control channel) is received from a serving cell or a UE transmits the uplink data (data in the data/control channel) within a time (e.g., an SSB based measurement timing configuration (SMTC) window duration) in which the UE performs measurement. d Accordingly, a method by which a UE effectively receives downlink data or effectively transmits uplink data in a period in which the UE performs SSB based measurement is required.

II. Second Problem

Meanwhile, RRM measurement performed by a UE in NR includes SSB based measurement, CSI-RS based measurement, and etc. The second problem relates to CSI-RS based measurement. If the numerology of DL data (transmitted through an active DL BWP) of a serving cell is the same as the numerology of a CSI-RS of a neighbor cell, a UE may simultaneously receive the DL data of the serving cell and the CSI-RS of the neighbor cell. For example, in FR 1 band, the UE may simultaneously receive the DL data of the serving cell and the CSI-RS of the neighbor cell using an omnidirectional antenna.

However, when the numerology of the DL data of the serving cell is different from the numerology of the CSI-RS of the neighbor cell (e.g., when subcarrier spacings are different from each other), the UE may not simultaneously receive the DL data of the serving cell and the CSI-RS of the neighbor cell according to UE capability. This is because the UE may or may not support simultaneous reception of signals having different numerologies (e.g., simultaneous reception of signals based on different subcarrier spacings) according to UE implementation.

When the UE supports simultaneous reception of signals having different numerologies, there is no problem in network operation. When the UE cannot support simultaneous reception of signals having different numerologies, operations of the UE and network need to be defined for CSI-RS based measurement. However, there was no conventional method by which a UE performs CSI-RS based measurement in consideration of capability when the numerology of a CSI-RS of a neighbor cell is different from that of DL data of a serving cell.

<Disclosures of Present Specification>

I. First Disclosure—SSB Based Measurement

Depending on UE implementation of UE manufacturers, the number of reception beams (Rx beams) used to receive a signal of a serving cell may be set to be different from the number of Rx beams used to receive a signal of a neighbor cell.

For example, when a UE performs measurement with respect to the neighbor cell, the UE may perform measurement using a number of (e.g., 4) Rx beams which is equal to or less than the number of (e.g., 8) of Rx beams used to receive a data/control channel from the serving cell. The number of Rx beams when measurement with respect to the neighbor cell is performed may be determined in consideration of measurement delay, power consumption, spherical coverage, and the like.

In general, in order to secure link quality and performance, a narrow Rx beam is used when a data/control channel is received from the serving cell or a data/control channel is transmitted to the serving cell.

The purpose of RRM measurement (e.g., RSRP/RSRQ/SINR measurement) is to guarantee UE mobility by comparing an RSRP/RSRQ level of the serving cell with an RSRP/RSRQ level of a neighbor cell. Accordingly, it is efficient for a UE to use wide Rx beams (fewer than narrow Rx beams) rather than using narrow Rx beams for RSRP/RSRQ/SINR measurement. When narrow Rx beams are used, the number of Rx beams is larger than the number of wide Rx beams when the wide Rx beams are used, and thus measurement time increases. Long measurement time may affect UE mobility. Since measurement time is directly related to the number of Rx beams, it is effective to use wide Rx beams for RRM measurement.

In the first disclosure of the present specification, a method by which a UE effectively receives an SSB and a downlink data/control channel signal when the serving cell transmits the SSB and the downlink data/control channel signal in an SMTC window duration is described.

For reference, SMTC means SS block based measurement timing configuration. The SMTC window direction indicates a time window in which a UE expects SSB reception. The serving cell may transmit information about SMTC including the length of the SMTC window duration, SMTC periodicity, and SMTC offset to the UE. That is, the UE may receive the information about SMTC from the serving cell through higher layer signaling (e.g., RRC signaling). Then, the UE may perform RRM measurement in the SMTC window duration based on the information about SMTC.

The UE maintains narrow Rx beam operation while data/control channel transmission or reception is performed. In addition, the UE changes the narrow Rx beam operation to wide Rx beam operation during the SMTC window duration (an example of RRM measurement duration). A gNB (next generation NodeB) may schedule DL/UL data for symbols (duration in which an SSB is not transmitted from the neighbor cell) in the RRM measurement duration (e.g., SMTC window duration). The UE may receive a data/control channel from the serving cell or transmit a data/control channel to the serving cell in the RRM measurement duration.

In such a case, two operations of the UE may be considered.

The first operation is an operation in which the UE receives an SSB using wide Rx beams in the RRM measurement duration and receives a data/control channel signal using narrow Rx beams. For example, the first operation may be performed in a case in which the number of Rx beams may be changed in the RRM measurement duration (e.g., a case in which a duration in which the SSB is transmitted and a duration in which the data/control channel signal is transmitted do not overlap).

The second operation is an operation in which the UE receives a data/control channel signal using wide Rx beams in the RRM measurement duration. Here, the serving cell transmits the data/control channel signal based on a low MCS level and the UE may receive the data/control channel signal based on the low MCS level. For example, the second operation may be performed in a case in which the number of Rx beams cannot be changed in the RRM measurement duration (e.g., a case in which a duration in which the SSB is transmitted and a duration in which the data/control channel signal is transmitted overlap).

Figure 9A:
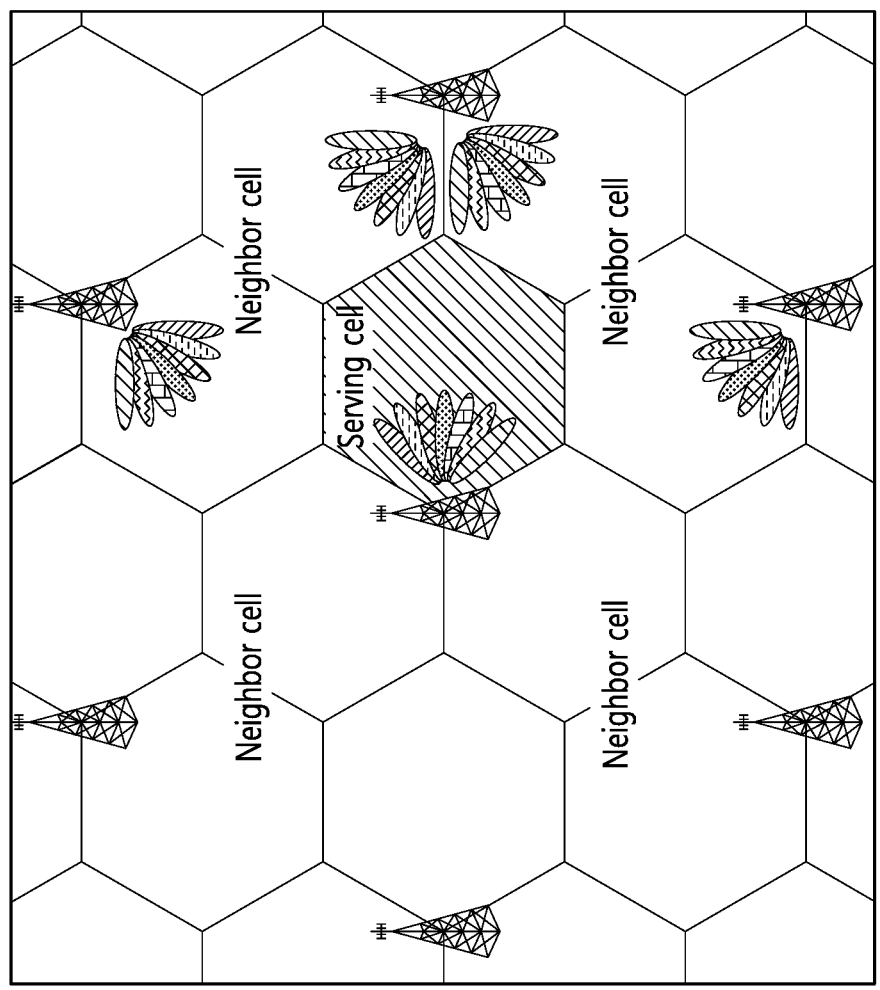

FIGS. 9A to 9C Illustrate an Example of an Operation of a UE According to the First Disclosure of the Present Specification.

The first operation will be described first with reference to FIGS. 9A and 9B.

FIG. 9A illustrates an example in which a serving cell and neighbor cells transmit downlink signals using a plurality of transmission (Tx) beams. Specifically, in FIG. 9A, the serving cell and the neighbor cells transmit downlink signals using 8 Tx beams through beamforming. The number of Tx beams used by the serving cell and the neighbor cells is merely an example.

The serving cell may transmit information about SMTC to the UE. In addition, the serving cell may schedule a data/control channel signal (i.e., downlink data or uplink data) in an SMTC window duration. When the UE receives a downlink control channel signal from the serving cell, it is possible to ascertain whether downlink data is scheduled within the SMTC window duration.

Then, the UE may receive an SSB using wide Rx beams (a first number of Rx beams) in a first interval in which the SSB is transmitted in the SMTC window duration. In addition, the UE may receive or transmit a data/control channel signal using narrow Rx beams (a second number of Rx beams) in a second interval in which the data/control channel signal is received or transmitted in the SMTC window duration. That is, the UE may effectively receive the SSB and the data/control channel signal using different numbers of Rx beams used to receive the SSB and Rx beams used to receive or transmit the data/control channel signal in the SMTC window duration.

In FIG. 9B, the operation of the UE is described through an example in which the first number is 4 and the second number is 8. For reference, the length of SMTC duration (denoted by SMTC in the figure) and SMTC period (denoted by SMTC periodicity in the figure) in FIG. 9B are identical to the length of SMTC duration (denoted by SMTC in the figure) and SMTC period (denoted by SMTC periodicity in the figure) in FIG. 9C. Although the UE may transmit a data/control channel signal in an RRM measurement duration, description will be focus on a case in which the UE receive a data/control channel signal for convenience.

FIG. 9B illustrates an example of an operation of the UE when the serving cell transmits an SSB and a data/control channel signal in the SMTC window duration. Referring to FIG. 9B, the UE may perform RRM measurement based on wide Rx beams in the RRM measurement duration (SMTC window duration).

The UE may receive the SSB based on wide Rx beams (e.g., 4 Rx beams) and perform RRM measurement in the RRM measurement duration. When the serving cell (serving gNB) allocates DL/UL data scheduling within the RRM measurement duration (e.g., SMTC duration), the UE may change the wide Rx beams to narrow Rx beams (e.g., 8 Rx beams) in the RRM measurement duration.

Referring to FIG. 9B, the UE receives the SSB of the serving cell using the wide Rx beams and performs SSB based measurement. In addition, the UE receives the SSB of the serving cell and SSBs of neighbor cells using the wide Rx beams and performs SSB based measurement. When the serving cell allocates DL/UL data scheduling within the RRM measurement duration, the UE may change Rx beams from the wide Rx beams to narrow Rx beams in order to transmit or receive a data/control channel after RRM measurement with respect to neighbor cells. The UE may change the wide Rx beams to the narrow Rx beams and receive DL data in a duration in which DL/UL data is scheduled. Or, the UE may change the wide Rx beams to the narrow Tx beams and transmit UL data.

Meanwhile, in order for the UE to change Rx beams from wide Rx beams to narrow Rx beams or from narrow beams to wide beams, one or two symbols are required. This is because a time corresponding to one or two symbols may be required for the UE to change the number of Rx beams in the RRM measurement duration or to change Rx beams due to change in Tx beams of a base station. Accordingly, the serving gNB may not schedule a data/control channel for one or two symbols before and after measurement of consecutive RRM RS (SSB) symbols. Then, the UE may consider that the data/control channel is not transmitted in the one or two symbols before and after measurement of the consecutive RRM RS (SSB) symbols.

Hereinafter, the second operation will be described with reference to FIG. 9C, Table 6 and Table 7.

There are cases in which the UE cannot change Rx beam operation from wide Rx beams to narrow Rx beams in the RRM measurement duration in a situation in which the serving gNB has allocated a data/control channel in the RRM measurement duration (e.g., SMTC window). Such cases may include, for example, a case in which the UE manufacturer does not permit change of the number of Rx beams in the RRM measurement duration, a case in which a duration in which an SSB is transmitted and a duration in which a data/control channel signal is transmitted overlap, and the like.

When the UE cannot change Rx beams to narrow Rx beams, the UE needs to receive or transmit a data/control channel in the RRM measurement duration using wide Rx beams. Referring to FIG. 9C, the UE may perform measurement for SSB in the RRM measurement duration using wide Rx beams and receive or transmit a data/control channel signal in the RRM measurement duration using wide Rx beams. In this case, expected link quality may deteriorate because the gain of the wide Rx beams is less than the gain of narrow Rx beams. This means that performance may deteriorate when a high MCS is allocated for data transmission or reception in the RRM measurement duration.

To prevent link quality deterioration or performance deterioration, use of a low MCS level may be guaranteed for data transmission in the RRM measurement window duration (SMTC window). In other words, the UE and the serving cell may transmit/receive data based on a low MCS level when a data/control channel signal is scheduled in the RRM measurement window duration. For example, QPSK or 16 QAM (e.g., MCS indexes 0 to 16) may be used for data transmission in the RRM measurement window duration (SMTC window duration).

The serving cell may transmit a data/control channel signal (downlink data) based on an MCS table related to a low MCS level in the RRM measurement duration. Then, the UE may receive the downlink data from the serving cell based on the MCS table related to the low MCS level. On the contrary, the UE may transmit a data/control channel signal (uplink signal) based on the MCS table related to the low MCS level in the RRM measurement duration. Then, the serving cell may receive the uplink signal based on the MCS table related to the low MCS level.

For example, MCS index tables shown in Table 6 and Table 7 may be used for a PDSCH transmitted by the serving cell and a PUSCH transmitted by the UE in the RRM measurement duration.

TABLE 6

| MCS Index $I_{MCS}$ | Modulation Order $Q_m$ | Target code Rate R × [1024] | Spectral efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |

Table 6 is an example of a reduced MCS index table used for PDSCH transmission in the RRM measurement duration. Referring to Table 6, a modulation order includes only 2 and 4. That is, QPSK or 16 QAM which is a low MCS level is used. The serving cell may transmit a PDSCH based on Table 6 and the UE may receive the PDSCH based on Table 6.

TABLE 7

| MCS Index $I_{MCS}$ | Modulation Order $Q_m$ | Target code Rate R × [1024] | Spectral efficiency |
| --- | --- | --- | --- |
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |

TABLE 7-continued

| MCS Index $I_{MCS}$ | Modulation Order $Q_m$ | Target code Rate R × [1024] | Spectral efficiency |
|---|---|---|---|
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |

Table 7 is an example of a reduced MCS index table used for PUSCH transmission in the RRM measurement duration. When q=1 in Table 7, pi/2 BPSK is used. When q=2, QPSK is used. Referring to Table 7, a modulation order includes only 2 and 4. That is, QPSK or 16 QAM which is a low MCS level is used. The UE may transmit a PUSCH based on Table 6 and the serving cell may receive the PUSCH based on Table 7.

Figure 10:
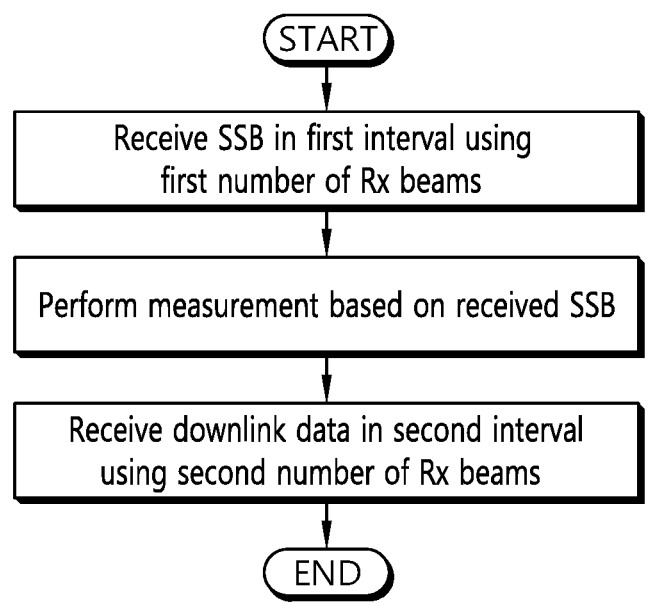
FIG. 10 is a flowchart illustrating an example of an operation of a UE according to the first disclosure of the present specification.

FIG. 10 is a flowchart illustrating an example of the operation of a UE according to the first disclosure of the present specification.

Referring to FIG. 10, the UE may receive an SSB in a first interval using a first number of Rx beams. Here, the first interval may be an interval in which the SSB is received in an RRM measurement duration (SMTC window duration).

The UE may perform measurement based on the received SSB. Specifically, the UE may perform RRM measurement based on the SSB. In addition, the UE may report a measurement result to a serving cell.

The UE may receive downlink data in a second interval using a second number of Rx beams. Alternatively, the UE may transmit uplink data in the second interval using the second number of Tx beams. The second number may be greater than the first number. The second number of Rx beams may correspond to narrow Rx beams and the first number of Rx beams may correspond to wide Rx beams. It can be considered that downlink data is not transmitted in a third interval in which the number of Rx beams is changed from the first number to the second number or from the second number to the first number. The serving cell may not schedule downlink data in the third interval. Here, the third interval may correspond to a time (one or two symbols) required for the UE to change the number of Rx beams.

The second number may be equal to the first number. When the second interval and the first interval overlap, the second number may be equal to the first number. In this case, downlink data may be transmitted from the serving cell based on an MCS index table related to a low MCS level. Here, the MCS index table related to the low MCS level may include an MCS index related to QPSK and an MCS index related to 16 QAM.

II. Second Disclosure—CSI-RS Based Measurement

In the second disclosure, operations of a UE and a network for efficient CSI-RS based RRM measurement are proposed. The second disclosure is described based on intra-frequency RRM measurement. This is merely an example and operations described in the second disclosure may be extended and applied to inter-frequency RRM measurement.

As described in the second problem, when a UE may simultaneously receive data (transmitted from a serving cell) and a CSI-RS (transmitted from a neighbor cell) to which different numerologies are applied in an active bandwidth part (BWP), UE and network operations are not limited in FR1 band. For reference, an active DL BWP may be a BWP allocated by the serving cell to the UE for downlink communication.

If the UE cannot simultaneously receive a CSI-RS and data having different numerologies in an active DL BWP, the network may set a measurement gap or scheduling restriction in the second disclosure.

On the contrary, in an active DL BWP in CSI-RS based RRM measurement, the measurement gap or scheduling restriction is not necessary in i) a case in which the UE supports simultaneous reception for multiple numerologies and ii) a case in which the numerology of the CSI-RS is the identical to the numerology of data (transmitted from the serving cell).

To identify whether the network requires a measurement gap, capability information about supporting of simultaneous reception of multiple numerologies may be newly defined in CSI-RS based RRM measurement (L3 measurement). The capability information about supporting of simultaneous reception of multiple numerologies may be defined as simultaneousRxDataCSIRS-DiffNumerology, for example. The UE may transmit the capability information about supporting of simultaneous reception of multiple numerologies to the serving cell.

The serving cell may ascertain whether the UE may simultaneously receive multiple numerologies based on the capability information about supporting of simultaneous reception of multiple numerologies. That is, the serving cell may determine whether a measurement gap is required. Table 8 shows an example of the capability information about supporting of simultaneous reception of multiple numerologies.

TABLE 8

MeasParametersMRDC-FRX-Diff ::=  SEQUENCE  {simultaneousRxDataSSB-DiffNumerologyENUMERATED {supported}  OPTIONAL  simultaneousRxDataCSIRS-DiffNumerologyENUMERATED {supported}  OPTIONAL}

Table 8 is an example of the capability information about supporting of simultaneous reception of multiple numerologies. In Table 8, simultaneousRxDataSSB-DiffNumerology is information representing whether simultaneous reception is possible when the numerology of an active DL BWP is different from the numerology of an SSB. simultaneousRxDataCSIRS-DiffNumerology is information representing whether simultaneous reception is possible when the numerology of an active DL BWP is different from the numerology of a CSI-RS. When the numerology of data (transmitted from the serving cell) is different from the numerology of the CSI-RS in an active DL BWP and a UE does not support simultaneous reception of the CSI-RSs having a different numerology, the second disclosure proposes 1) measurement gap configuration (first example) and 2) window configuration (second example). For reference, a UE described in the first example and the second example does not support simultaneous reception of a CSI-RS of a neighbor cell which has a different numerology from that of data (transmitted from the serving cell) in an active DL BWP and DL data of the serving cell (transmitted through the active DL BWP).

Hereinafter, the first example of the second disclosure will be described first with reference to FIGS. 11 and 12.

The serving cell may configure a measurement gap for a UE that does not support simultaneous reception of a CSI-RS of a neighbor cell which has a different numerology from that of data (transmitted from the serving cell) in an active DL BWP and DL data of the serving cell.

The serving cell may configure a measurement gap such that the UE may receive the CSI-RS of the neighbor cell which has a different numerology from that of the DL data of the serving cell although measurement is not inter-frequency measurement.

Figure 11:
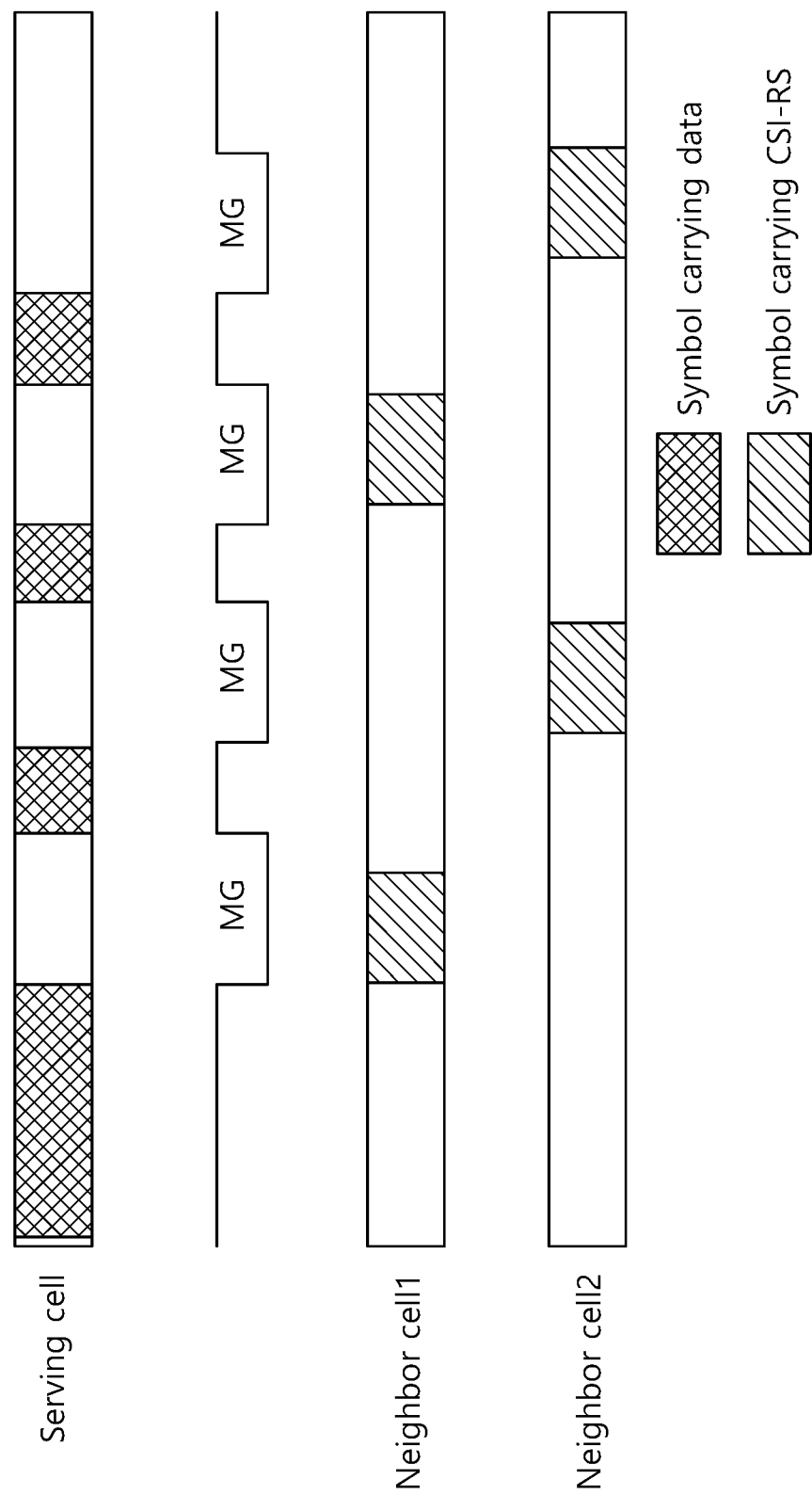
FIG. 11 illustrates a first example of measurement gap configuration according to a first example of a second disclosure of the present specification.

FIG. 11 illustrates a first example of measurement gap configuration according to the first example of the second disclosure of the present specification.

Referring to FIG. 11, CSI-RSs transmitted by neighbor cell 1 and neighbor cell 2 are separated each other and the serving cell may configure a measurement gap for each CSI-RS. For reference, in the example illustrated in FIG. 11, the serving cell does not restrict scheduling of CSI-RS transmission of the neighbor cells. The serving cell may transmit information about measurement gaps to a UE. Then, the UE may receive the CSI-RSs of the neighbor cells in the measurement gaps and perform CSI-RS based measurement based on the information about the measurement gaps.

In RAN 1 specification, timing of CSI-RS transmission from a cell (gNB) is defined to depend on a higher layer parameter period and a slot offset. In addition, CSI-RS based RRM measurement timing configuration is not defined with respect to CSI-RS transmission distinguished from SMTC measurement timing configuration. Accordingly, an excessively large number of measurement gaps may be configured unless CSI-RS scheduling is restricted. Furthermore, a measurement gap length is 3 ms, 4 ms or 6 ms in FR1. Accordingly, data transmission and reception are impossible for at least 3 ms even when a measurement gap is configured only for a CSI-RS of a single neighbor cell. Therefore, when multiple neighbor cells transmit CSI-RSs in a state in which CSI-RS transmission scheduling is not restricted, durations, in which data transmission and reception are impossible, increases and thus the number of data transmission opportunities of the serving cell may be reduced.

Accordingly, when a UE requires measurement gap configuration for measurement of CSI-RSs of neighbor cells, restriction on CSI-RS configuration (restriction by the network) needs to be considered. In FIG. 12, a second example of measurement gap configuration in which CSI-RS configuration is restricted is illustrated.

Figure 12:
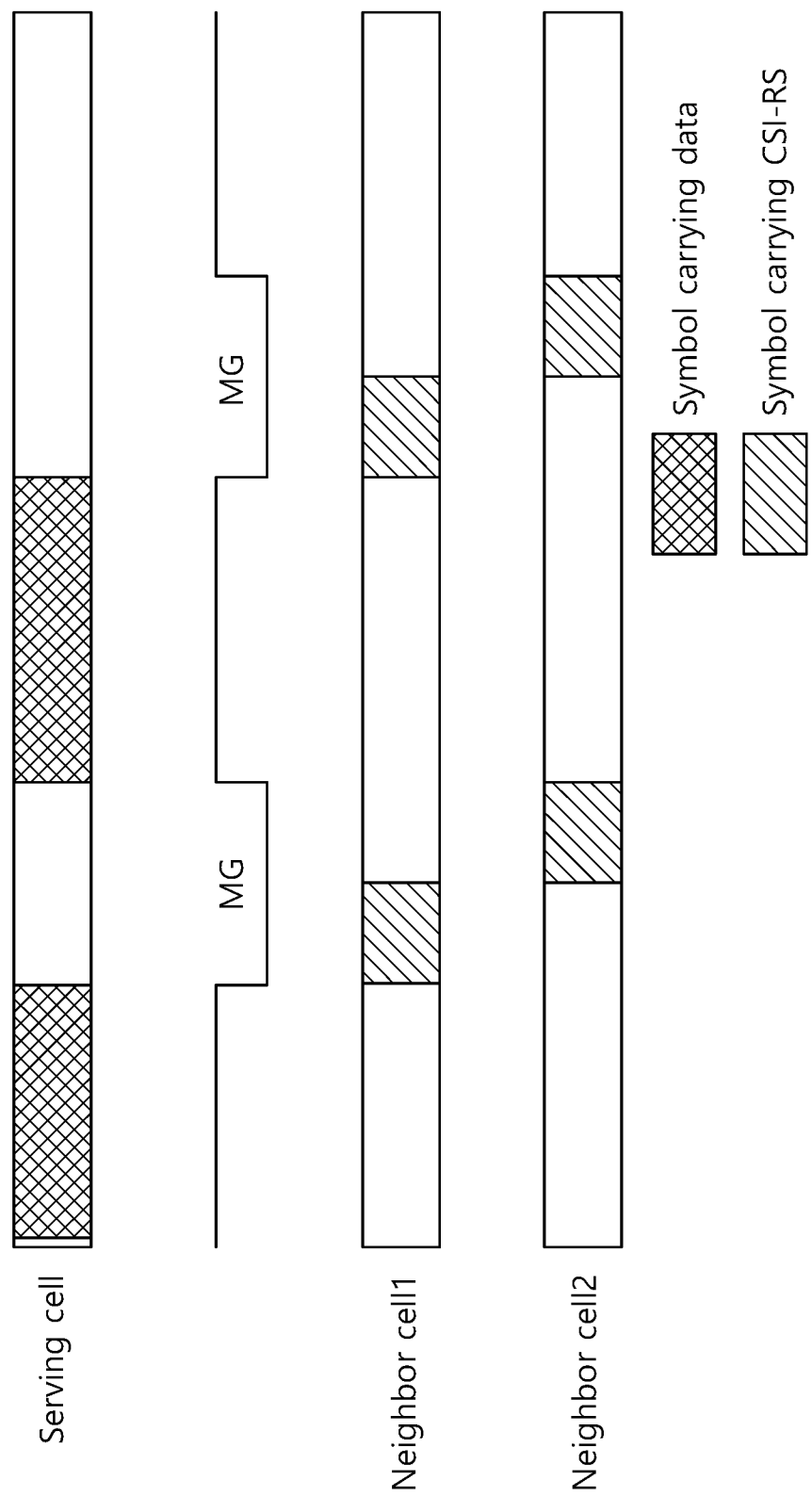
FIG. 12 illustrates a second example of measurement gap configuration according to the first example of the second disclosure of the present specification.

FIG. 12 Illustrates the Second Example of Measurement Gap Configuration According to the First Example of the Second Disclosure of the Present Specification.

The serving cell may restrict scheduling of CSI-RS transmission of neighbor cells based on measurement gaps. A CSI-RS (transmitted from a gNB) for L3 mobility needs to be transmitted from the gNB within a set measurement gap length. In other words, the serving cell may configure measurement gaps and transmit information about the measurement gaps to neighbor cells. In addition, the serving cell may set such that CSI-RSs of the neighbor cells are transmitted in the measurement gaps through network coordination. That is, the serving cell may configure such that the CSI-RSs of the neighbor cells are transmitted in the measurement gaps by controlling CSI-RS periodicity and offset of the neighbor cells through network coordination. For example, the serving cell may transmit information about a measurement gap and offset information corresponding to each neighbor cell to each neighbor cell. Then, each neighbor cell may transmit a CSI-RS at a position, which is allocated to the neighbor cell itself, in a measurement gap based on the information about the measurement gap and the offset information received from the serving cell.

The serving cell may limit CSI-RS transmission of neighbor cells within a measurement gap length set based on a restricted CSI-RS periodicity set through network coordination. In a case in which a measurement gap is used in FR1 band and intra-frequency measurement, the numerology of the CSI-RS differs from the numerology of data (transmitted from the serving cell) in a DL BWP, and a UE does not support simultaneous reception of multiple numerologies for CSI-RS resources, a restricted CSI-RS periodicity set may be used.

Referring to FIG. 12, neighbor cell 1 and neighbor cell 2 transmit CSI-RSs in measurement gaps configured by the serving cell. The UE may receive the CSI-RSs of the neighbor cells based on information about measurement gaps received from the serving cell.

Table 9 shows a restricted CSI-RS periodicity set.

TABLE 9

| |
|---|
| CSI-ResourcePeriodicityAndOffset ::= CHOICE {slots4 INTEGER (0..3), slots5 INTEGER (0..4), slots8 INTEGER (0..7), slots10 INTEGER (0..9), slots16 INTEGER (0..15), slots20 INTEGER (0..19), slots32 INTEGER (0..31), slots40 INTEGER (0..39), slots64 INTEGER (0..63), slots80 INTEGER (0..79), slots160 INTEGER (0..159), slots320 INTEGER (0..319), slots640 INTEGER (0..639)} |

For CSI-RS based RRM measurement, the serving cell may restrict a specific subset of CSI-ResourcePeriodicityAndOffset used by a neighbor cell. In Table 9, CSI-ResourcePeriodicityAndOffset means periodicity and offset of a CSI-RS resource. In Table 9, A in slotsA represents CSI-RS transmission periodicity and a set of integers in slotA means an offset when CSI-RS transmission periodicity is A. The serving cell may configure CSI-RS transmission periodicity and offset for a neighbor cell such that the CSI-RS of the neighbor cell is transmitted in a measurement gap based on configured measurement gaps. In addition, the serving cell may restrict CSI-RS scheduling of the neighbor cell by transmitting the CSI-RS transmission periodicity and offset to the neighbor cell. The second example of the second disclosure will be described with reference to FIG. 13.

Figure 13:
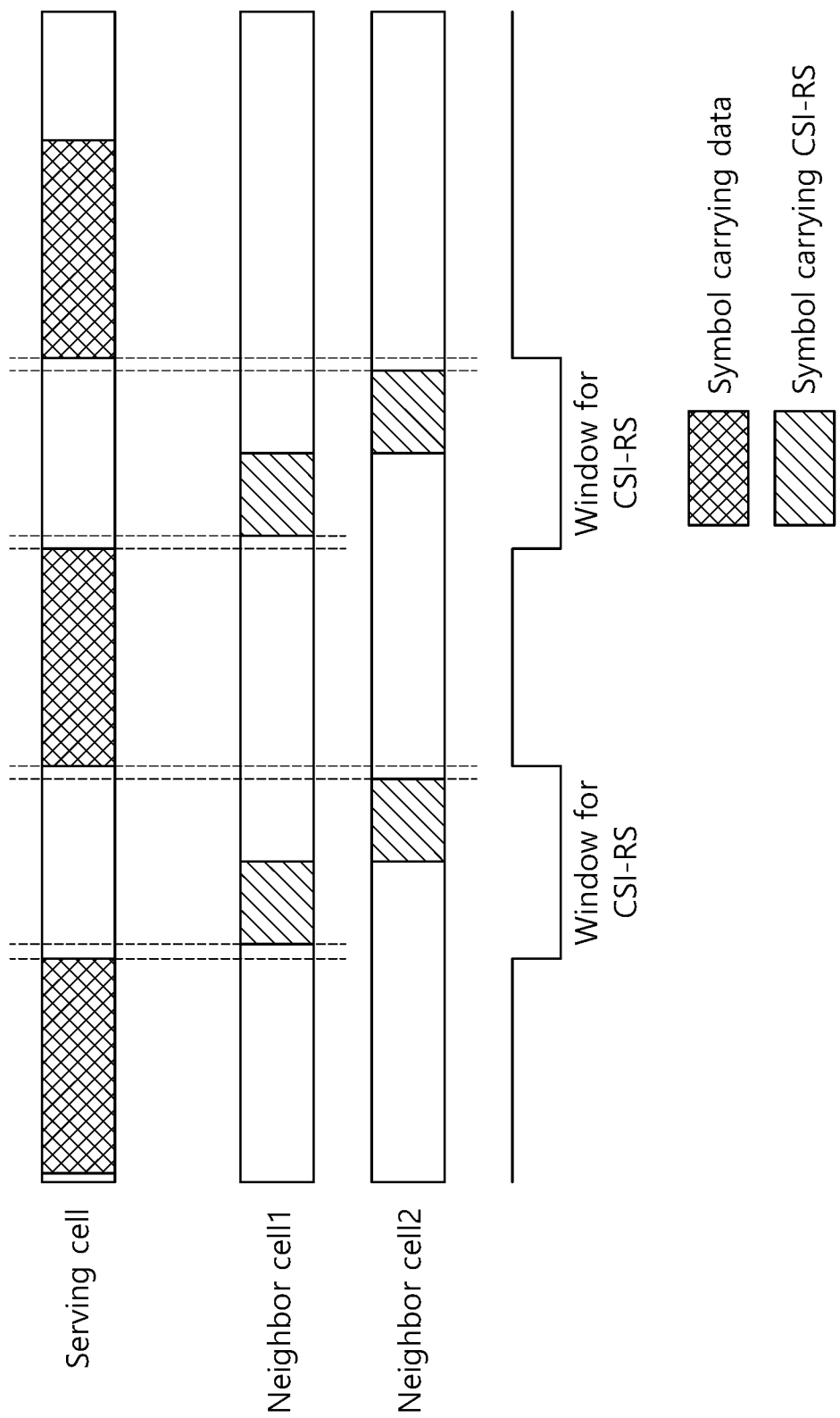
FIG. 13 illustrates an example of window configuration according to a second example of the second disclosure of the present specification.

FIG. 13 Illustrates an Example of Window Configuration According to the Second Example of the Second Disclosure of the Present Specification.

In the second example of the second disclosure, scheduling similar to SMTC used for SSB based measurement may be used for CSI-RS transmission scheduling. That is, in a case in which the numerology of the CSI-RS differs from the numerology of data (transmitted from the serving cell) in a DL BWP and a UE does not support simultaneous reception of multiple numerologies for CSI-RS resources, scheduling similar to scheduling used for SSB based measurement may be used. The serving cell may configure a window duration for the CSI-RS.

The UE may be expected to transmit a PUCCH/PUSCH or not to transmit a PDCCH/PDSCH one data symbol before and after (in a window duration for the CSI-RS) measured CSI-RS symbols and consecutive CSI-RS symbols.

CSI-RS transmission timing from neighbor gNBs depends on periodicity and slot offset according to higher-layer parameters. Accordingly, the number of control/data channel transmission and reception opportunities may be considerably reduced due to scheduling restriction on one data symbol before/after consecutive CSI-RSs. In intra-frequency CSI-RS based RRM measurement (L3 measurement) in FR1, the serving cell may restrict CSI-RS configuration such that a CSI-RS of a neighbor cell is transmitted in a window duration for the CSI-RS similarly to SMTC. For example, the serving cell may restrict a specific subset of CSI-ResourcePeriodicityAndOffset used by a neighbor cell as shown in the example of Table 9.

Accordingly, when the numerology of the CSI-RS differs from the numerology of data (transmitted from the serving cell) in a DL BWP and the UE does not support simultaneous reception of multiple numerologies for CSI-RS resources, if a measurement gap is not used for intra-frequency in FR1, the serving cell may configure a window duration for the CSI-RS and schedule the CSI-RS of a neighbor cell based on the window duration. Specifically, in order to avoid serious loss of control/data channel transmission and reception opportunities, the serving cell may restrict CSI-RS configuration of a neighbor cell such that the CSI-RS is transmitted within the window duration for the CSI-RS.

An example of a restricted window for the CSI-RS is illustrated in FIG. 13. As illustrated in FIG. 13, CSI-RSs of neighbor cells may be configured to be consecutive in windows for the CSI-RSs. For example, periodicity of a window duration for a CSI-RS may be a subset of CSI-RS periodicity, such as {5, 10, 20, 40} ms.

Figure 14A:
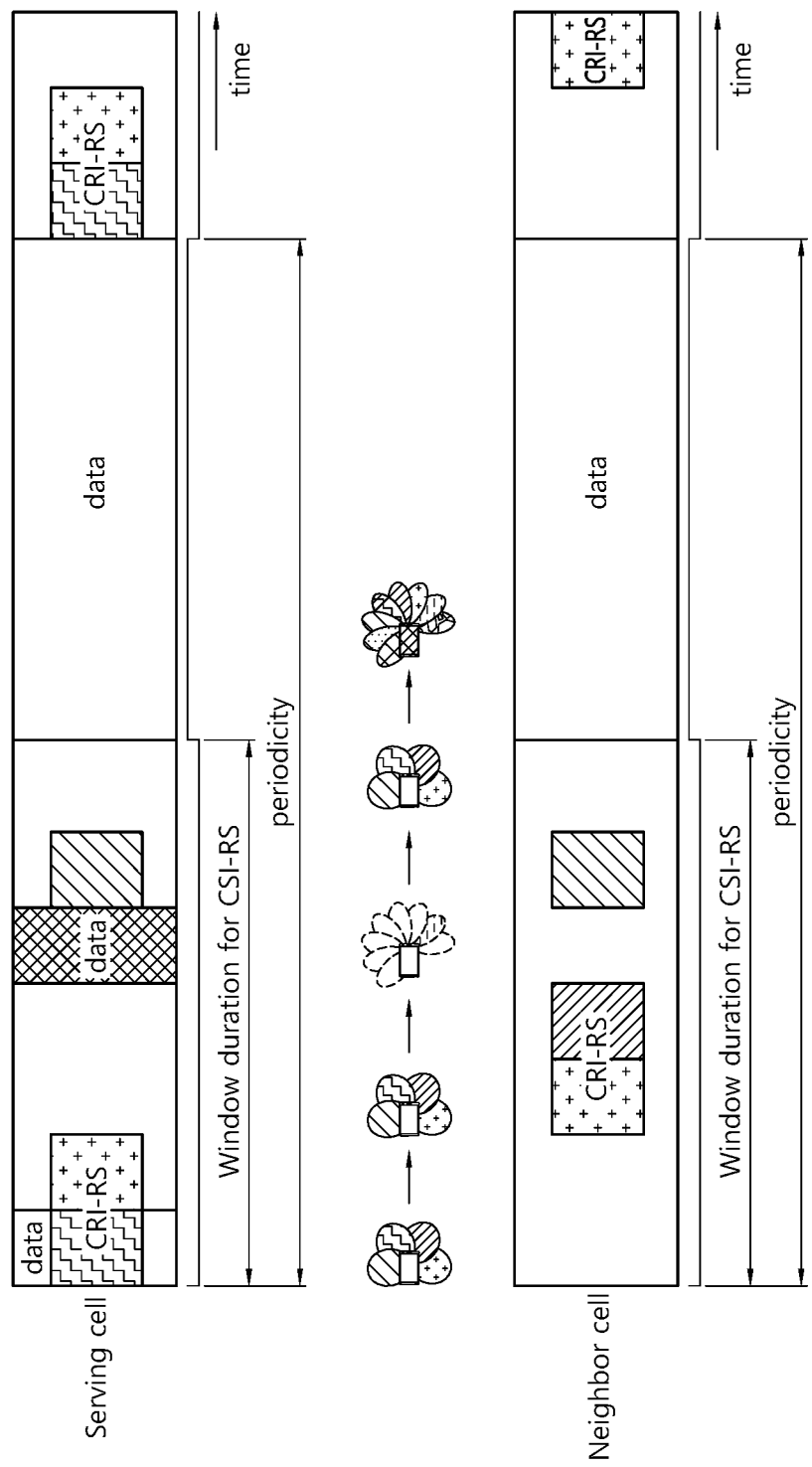
FIGS. 14A and 14B illustrate examples of window configuration in FR2 band according to a second example of the second disclosure of the present specification.
Figure 14B:
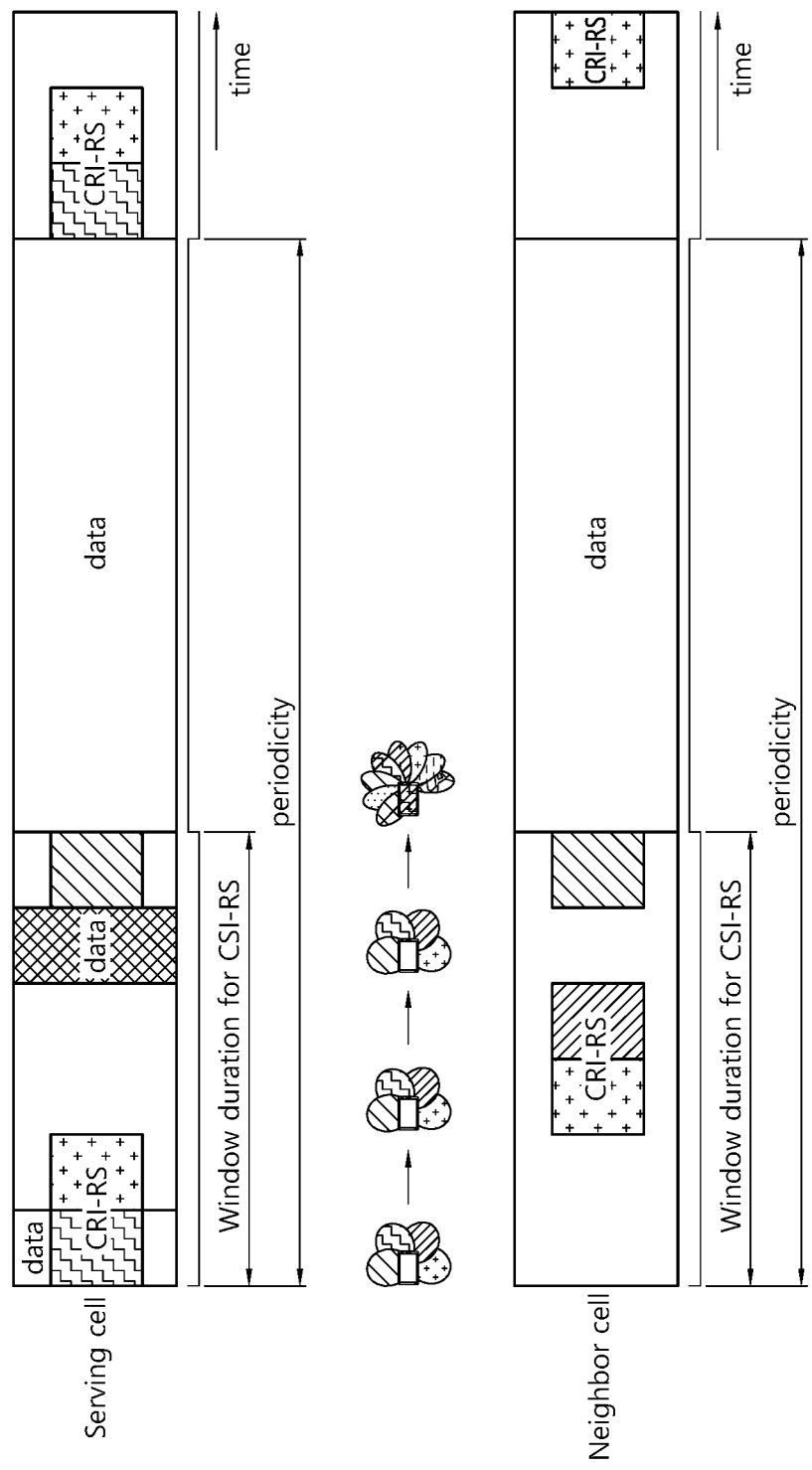

FIGS. 14A and 14B Illustrate Examples of Window Configuration in FR2 Band According to the Second Example of the Second Disclosure of the Present Specification.

In a case in which a UE performs CSI-RS based RRM measurement (L3 measurement) in a window duration for the CSI-RS in FR2 band, wide Rx beams may be used in order to reduce a measurement time. When a serving gNB transmits data in a restricted window duration for the CSI-RS, two UE operations may be considered similar to SSB based measurement of the first disclosure. The same description as that in the first disclosure is omitted and description focuses on differences. For reference, the length of the window duration for the CSI-RS and a window duration period (denoted by periodicity in the figure) for the CSI-RS of FIG. 14A are identical to the length of the window duration for the CSI-RS and a window duration period (denoted by periodicity in the figure) for the CSI-RS of FIG. 14B.

First operation (refer to FIG. 14A)—the UE may perform RRM measurement using wide Rx beams. When a neighbor cell (neighbor gNB) transmits a CSI-RS in a window duration for the CSI-RS, the UE receives the CSI-RS of the neighbor cell and performs RRM measurement with respect to the neighbor cell. After RRM measurement with respect to the neighbor cell, the UE may change Rx beams from wide Rx beams to narrow Rx beams (or narrow Tx beams) in order to receive or transmit a data/control channel. To change Rx beam configuration, one or two symbols are required. The serving gNB may not allocate a data/control channel in one or two symbols before/after transmission of consecutive RRM RS (CSI-RS) symbols (CSI-RS symbols of the neighbor cell that is a measurement target).

Second operation (refer to FIG. 14B)—in a case in which a neighbor gNB transmits a CSI-RS in a window duration for the CSI-RS and the UE cannot change wide Rx beams to narrow Rx beams (e.g., in a case in which a duration in which the CSI-RS is transmission and a duration in which a data/control channel signal is transmitted overlap), the UE may transmit or receive a data/control channel using wide Rx beams. In this case, expected link quality decreases because a wide Rx beam gain is less than a narrow Rx beam gain. This means that performance deteriorates when a high MCS is allocated to data transmission. For example, QPSK or 16 QAM (e.g., MCS indexes 0 to 16) may be used for data transmission in a restricted window duration for the CSI-RS. For example, the MCS index tables of Table 6 and Table 7 may be used.

Figure 15:
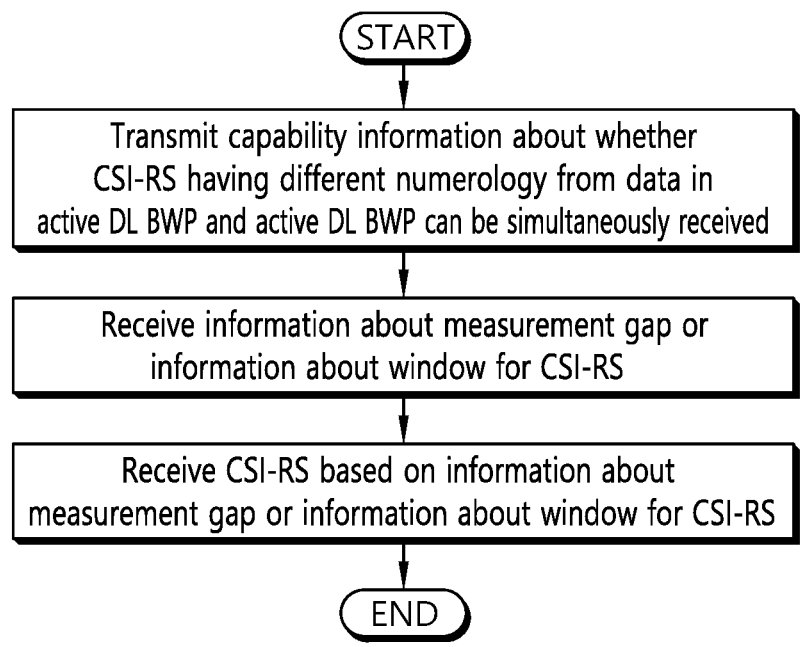
FIG. 15 is a flowchart illustrating an example of an operation of a UE according to the second disclosure of the present disclosure.

FIG. 15 is a Flowchart Illustrating an Example of an Operation of a UE According to the Second Disclosure of the Present Specification.

The UE may transmit capability information about whether the UE may simultaneously receive a CSI-RS and an active DL BWP having a different numerology from that of data (transmitted from a serving cell) in the active DL BWP to the serving cell. For example, the UE may transmit capability information about supporting of simultaneous reception of multiple numerologies, such as simultaneousRxDataCSIRS-DiffNumerology of FIG. 8.

The UE may receive information about measurement gaps or information about windows for CSI-RSs. For example, the UE may receive information about measurement gaps as described in the first example of the second disclosure. As another example, the UE may receive information about windows for CSI-RSs as described in the second example of the second disclosure.

The UE may receive CSI-RSs based on the information about measurement gaps or the information about windows for CSI-RSs. The UE may perform RRM measurement based on the received CSI-RSs. Then, the UE may transmit a measurement result to the serving cell.

Figure 16:
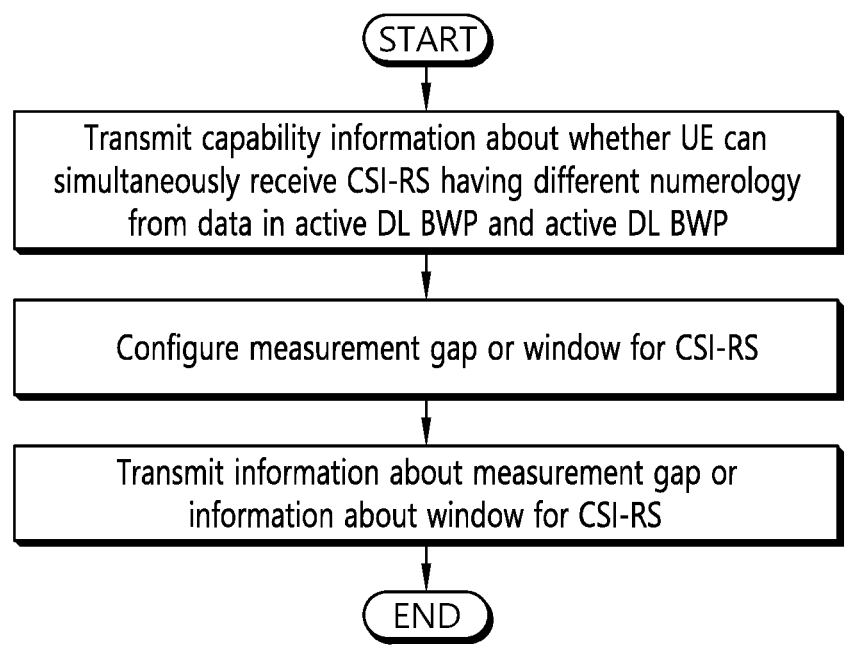
FIG. 16 is a flowchart illustrating an example of an operation of a serving cell according to the second disclosure of the present disclosure.

FIG. 16 is a Flowchart Illustrating an Example of an Operation of a Serving Cell According to the Second Disclosure of the Present Specification.

The serving cell may receive, from a UE, capability information about whether the UE may simultaneously receive a CSI-RS and an active DL BWP having a different numerology from that of data (transmitted from the serving cell) in the active DL BWP to the serving cell. For example, the serving cell may receive capability information about supporting of simultaneous reception of multiple numerologies, such as simultaneousRxDataCSIRS-DiffNumerology of FIG. 8.

The serving cell may configure measurement gaps or windows for CSI-RSs. For example, the serving cell may configure measurement gaps as described in the first example of the second disclosure. As another example, the serving cell may configure windows for CSI-RSs as described in the second example of the second disclosure. The serving cell may set scheduling of CSI-RS transmission of neighbor cells based on the measurement gaps or CSI-RSs through network coordination.

The serving cell may transmit information about the measurement gaps or information about the windows for CSI-RSs to the UE.

III. Third Disclosure

The above-described first and second disclosures may be combined. For example, a UE may perform the operation described in the first disclosure when executing SSB based measurement and perform the operation described in the second disclosure when executing CSI-RS based measurement. Similarly, a serving cell may perform the operation described in the first disclosure when executing SSB based measurement and perform the operation described in the second disclosure when executing CSI-RS based measurement.

Figure 17:
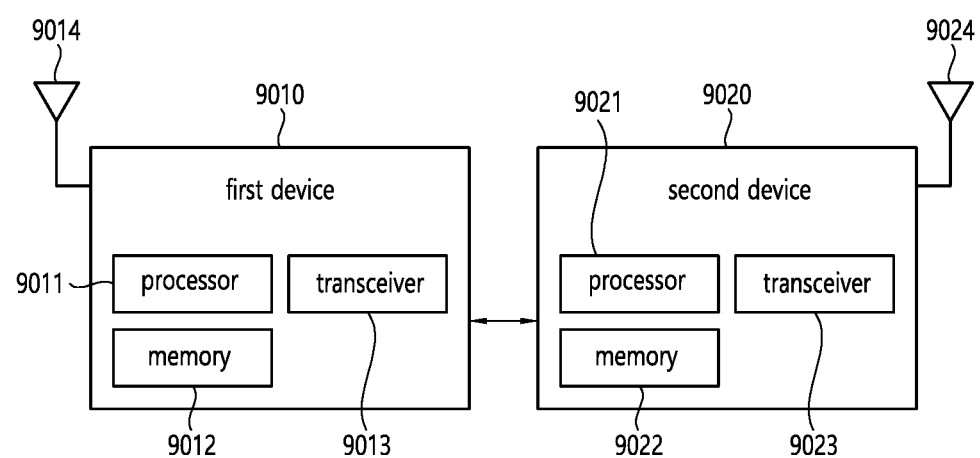
FIG. 17 illustrates a wireless communication device according to embodiments of the present specification.

FIG. 17 illustrates a wireless communication device according to embodiments of the present specification.

Referring to FIG. 17, a wireless communication system may include a first device 9010 and a second device 9020.

The first device 9010 may be a base station, a network node, a transmitting terminal, a receiving terminal, a wireless device, a wireless communication device, a vehicle, a vehicle equipped with an autonomous driving function, a connected car, a unmanned aerial vehicle (UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

The second device 9020 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may perform one or more protocols. The processor 9011 may perform one or more layers of a radio interface protocol. The memory 9012 may be connected to the processor 9011 and store various types of information and/or commands. The transceiver 9013 may be connected to the processor 9011 and controlled to transmit/receive a radio signal.

The second device 9020 may include at least one processor, such as a processor 9021, at least one memory, such as a memory 9022, and at least one transceiver, such as a transceiver 9023. The processor 9021 may perform the functions, procedures, and/or methods described above. The processor 9021 may implement one or more protocols. For example, the processor 9021 may implement one or more layers of the radio interface protocol. The memory 9022 may be connected to the processor 9021 and store various types of information and/or commands. The transceiver 9023 may be connected to the processor 9021 and controlled to transmit/receive a radio signal.

The memory 9012 and/or the memory 9022 may be each connected inside or outside the processor 9011 and/or the processor 9021 and connected to other processors through various techniques such as wired or wireless connection.

The first device 9010 and/or the second device 9020 may have one or more antennas. For example, an antenna 9014 and/or an antenna 9024 may be configured to transmit and receive the radio signal.

Figure 18:
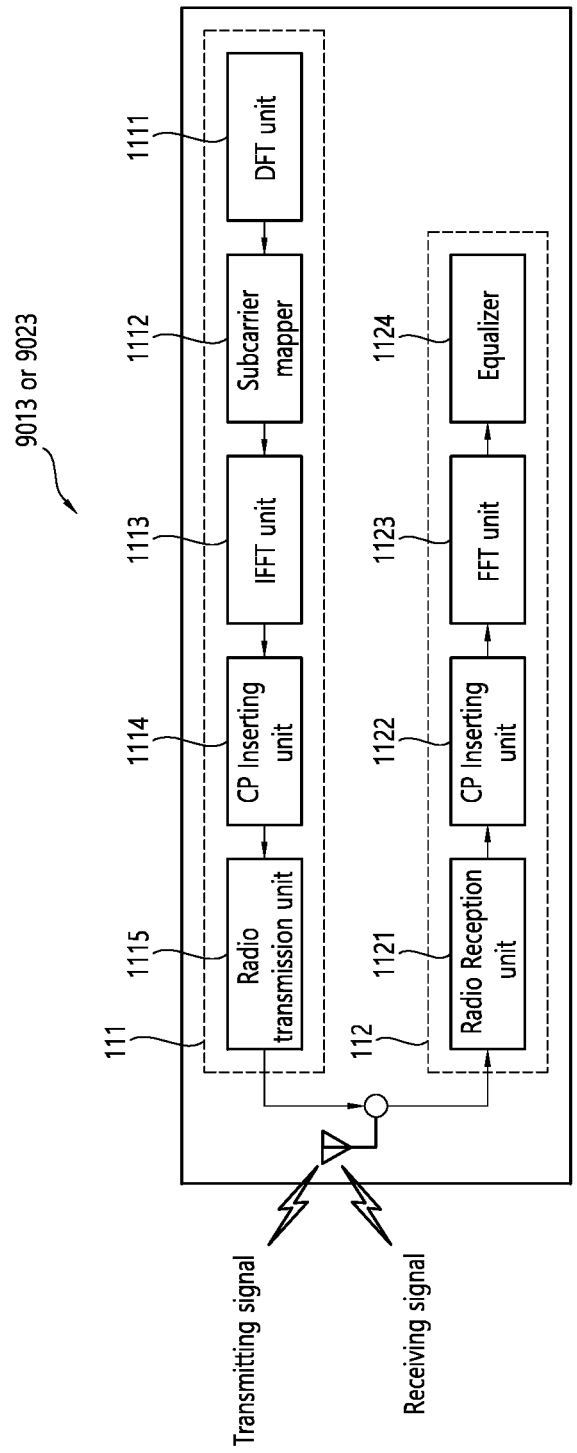
FIG. 18 is a detailed block diagram of a transceiver included in the wireless device shown in FIG. 17.

FIG. 18 is a detailed block diagram of a transceiver included in the wireless device shown in FIG. 17.

Referring to FIG. 18 the transceiver 9013 or 9023 includes a transmitter 111 and a receiver 112. The transmitter 111 includes a Discrete Fourier Transform (DFT) unit 1111, a subcarrier mapper 1112, an Inverse Fast Fourier Transform (IFFT) unit 1113, a CP inserter 1114, a radio transmitter 1115. The transmitter 111 may further include a modulator. Also, for example, the transmitter 111 may further include a scramble unit (not shown), a modulation mapper (not shown), a layer mapper (not shown), and a layer permutator (not shown), and these blocks may be positioned before the DFT unit 1111. More specifically, in order to prevent an increase in the peak-to-average power ratio (PAPR), the transmitter 111 allows information to pass through the DFT unit 1111 beforehand prior to mapping a signal to a subcarrier. After performing subcarrier mapping, a signal that is spread (or precoded, in the same sense) by the DFT unit 1111 through the subcarrier mapper 1112, a signal within a time axis is generated (or created) after the processed signal passes through the Inverse Fast Fourier Transform (IFFT) unit 1113.

The DFT unit 1111 performs DFT on the inputted symbols, thereby outputting complex number symbols (complex-valued symbols). For example, if Ntx symbols are inputted (wherein Ntx is an integer), a DFT size is equal to Ntx. The DFT unit 1111 may also be referred to as a transform precoder. The subcarrier mapper 1112 maps the complex number symbols to each subcarrier of the frequency domain. The complex number symbols may be mapped to resource elements corresponding to resource blocks being assigned for data transmission. The subcarrier mapper 1112 may also be referred to as a resource element mapper. The IFFT unit 1113 performs IFFT on the inputted symbols, thereby outputting a baseband signal for data, which correspond to a time domain signal. The CP inserter 1114 duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver 112 includes a radio receiver 1121, a CP remover 1122, a Fast Fourier Transform (FFT) unit 1123, and an equalizer 1124. The radio receiver 1121, the CP remover 1122, and the FFT unit 1123 of the receiver 112 respectively perform the inverse functions of the radio transmitter 1115, the CP inserter 1114, and the IFFT unit 1113 of the transmitter 111. The receiver 112 may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

Figure 19:
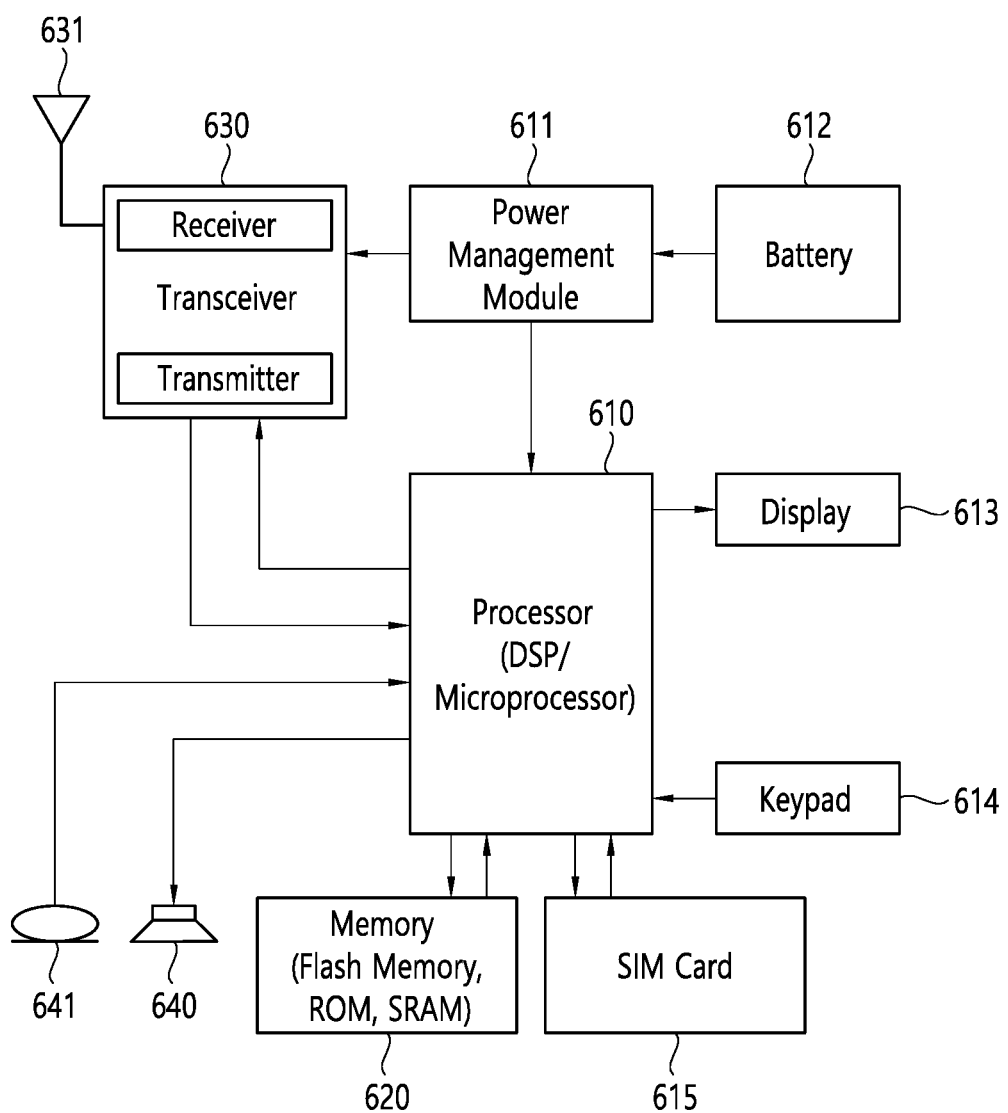
FIG. 19 illustrates a detailed example of the wireless communication device of FIG. 17.

FIG. 19 illustrates a detailed structure of the wireless communication device of FIG. 17.

FIG. 19 shows more detailed wireless communication device to implement an embodiment of the present specification. The present specification described above for UE side or network node side may be applied to this embodiment.

A wireless communication device includes a processor 610, a power management module 611, a battery 612, a display 613, a keypad 614, a subscriber identification module (SIM) card 615, a memory 620, a transceiver 630, one or more antennas 631, a speaker 640, and a microphone 641. The processor 610 corresponds to the processor 9011 or the processor 9021. The memory 620 corresponds to the memory 9012 or the memory 9022. The transceiver 630 corresponds to the transceiver 9013 or the transceiver 9023.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to determine transmission power; and control the transceiver 630 to transmit uplink signal based on the transmission power, wherein the transmission power meets a requirement for a minimum Equivalent Isotropic Radiated Power (EIRP) value for the spherical coverage, and wherein the requirement for the minimum EIRP value for the spherical coverage is predetermined based on a 50th percentile of a distribution of measured radiated power. The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to an embodiment of the present specification illustrated in FIG. 19, the UE may effectively receive downlink data from the serving cell in RRM measurement durations and effectively transmit uplink data in RRM measurement durations. In addition, according to an embodiment of the present specification, when the numerology of a CSI-RS of a neighbor cell differs from the numerology of DL data of the serving cell, CSI-RS based measurement may be effectively performed in consideration of UE capability.

<Artificial Intelligence (AI)>

Artificial Intelligence (AI) refers to AI itself or the field for studying how to build AI, and machine learning refers to the field for defining problems related to AI and studying how to tackle the problems. Machine learning is also defined as an algorithm that constantly performs a specific task to improve performance related to the task.

An Artificial Neural Network (ANN) is a model used in machine learning and may refer to entire models consisting of artificial neurons (nodes) forming a network through combination of synapses to solve problems. The ANN may be defined by a connection pattern between neurons on different layers, a learning procedure for updating a model parameter, and an activation function for generating an output value.

The ANN may include an input layer, an output layer, and selectively one or more hidden layers. Each layer may include one or more neurons, and the ANN may include a synapse connecting one neuron to another neuron. In the ANN, each neuron is able to output a value of an activation function with respect to input signals input through a synapse, weight, and bias.

A model parameter refers to a parameter to be decided through learning, and the model parameter includes a weight of synapse connection, bias in a neuron, etc. In addition, a hyperparameter refers to a parameter to be set in a machine learning algorithm before a learning process begins, and the hyperparameter includes a learning rate, the number of repetition, a mini-batch size, an initialization function, etc.

The purpose of training an ANN is to determine a model that minimizes a loss function. The loss function may be used as an indicator for determining an optimum model parameter in the process of training the ANN.

Machine learning may be classified into supervised learning, unsupervised learning, and reinforcement learning by types of learning.

The supervised learning may refer to a method for training an ANN with a given label for training data, and a label may refer to an answer (or a result) that an ANN needs to infer when training data is input to the ANN. The unsupervised learning may refer to a method for training an ANN without a given label for training data. The reinforcement learning may refer to a learning method for performing training an agent defined in a certain environment to select an action or action sequence that maximizes accumulative compensation.

Machine learning implemented as a Depp Neural Network (DNN) including a plurality of hidden layers among ANNs may be referred to as deep learning, and deep learning is part of machine learning. Hereinafter, machine learning is used to include deep learning.

Figure 20:
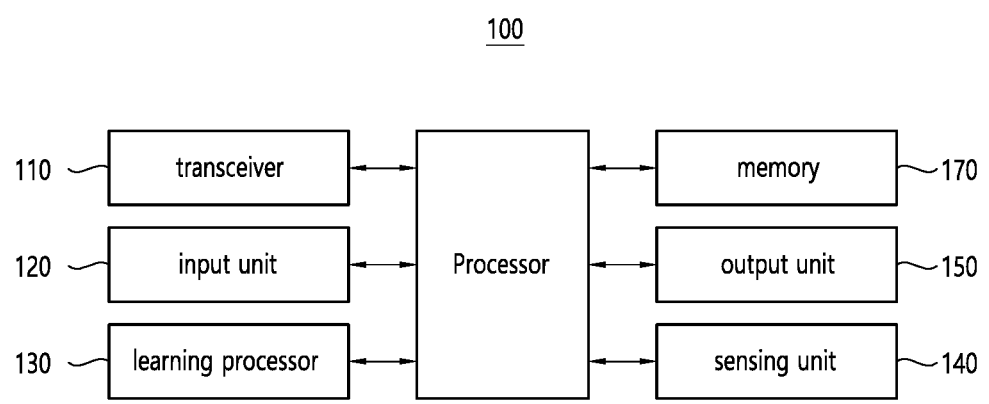
FIG. 20 illustrates an AI device 100 according to an embodiment of the present specification.

FIG. 20 Illustrates an AI Device 100 According to an Embodiment of the Present Specification.

The AI device 100 may be a fixed device or a mobile device, such as a TV, a projector, a mobile phone, a smart phone, a desktop, a laptop, a digital broadcasting terminal, a Personal Digital Assistant (PDA), a portable multimedia player (PMP), a navigation device, a tablet PC, a wearable device, a Set Top Box (STB), a DMB receiver, a radio, a washing machine, a refrigerator, a digital signage, a robot, a vehicle, etc.

The AI device (100) may correspond to the UE of the present specification or the serving cell of the present specification.

Referring to FIG. 20, a terminal 100 may include a transceiver 110, an input unit 120, a learning processor 130, a sensing unit 140, an output unit 150, a memory 170, and a processor 180.

The transceiver 110 may transmit and receive data with external devices such as other AI devices or an AI server by using a wired or wireless communication technology. For example, the transceiver 110 may transmit and receive sensor information, a user input, a trained model, a control signal, and the like with the external devices.

In this case, the communication technology used by the transceiver 110 may be Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), or the like.

The input unit 120 may acquire various kinds of data.

In this case, the input unit 120 may include a camera to input an image signal, a microphone to receive an audio signal, a user input unit to receive information from a user, and the like. Here, the camera or the microphone may be considered as a sensor, and a signal acquired from the camera or the microphone may be called sensing data or sensor information.

The input unit 120 may acquire input data, which is to be used to acquire an output, by using training data for training a model and a trained model. The input unit 120 may acquire unprocessed input data, and, in this case, the processor 180 or the learning processor 130 may extract an input feature from the input data by performing pre-processing.

The learning processor 130 may train a model, which is configured as an ANN, using training data. Here, a trained ANN may be referred to as a trained model. The trained model may be used to infer a result value from new input data, not from the training data, and the inferred value may be used as the basis of determining a certain operation.

In this case, the learning processor 130 may perform AI processing together with a learning processor of the AI server.

In this case, the learning processor 130 may include a memory integrated into or implemented in the AI device 100. Alternatively, the learning processor 130 may be implemented using the memory 170, an external memory coupled directly to the AI device 100, or a memory used in an external device.

Using various sensors, the sensing unit 140 may acquire at least one of internal information of the AI device 100, surrounding environment information of the AI device 100, or user information.

In this case, the sensors included in the sensor 140 may be a proximity sensor, an illumination sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a radar, a lidar, etc.

The output unit 150 may generate an output relating to visible sense, auditory sense, or tactile sense.

In this case, the output unit 150 may include a display for outputting visual information, a speaker for outputting auditory information, a haptic module for outputting tactile information, etc.

The memory 170 may store data that supports various functions of the AI device 100. For example, the memory 170 may store input data acquired by the input unit 120, training data, a trained model, a learning history, etc.

The processor 180 may determine at least one executable operation of the AI device 100 based on information that is decided or generated using a data analytic algorithm or a machine learning algorithm. In addition, the processor 180 may perform an operation that is determined by controlling elements of the AI device 100.

To this end, the processor 180 may request, search, receive, or utilize data from the learning processor 130 or the memory 170, and control the elements of the AI device 100 to execute a predicted operation among the at least one executable operation or execute an operation determined to be preferable.

In this case, when interaction with an external device is required to perform the determined operation, the processor 180 may generate a control signal for controlling the external device, and transmit the generated control signal to the external device.

The processor 180 may acquire intent information regarding a user input, and decide a user's demand based on the intent information.

In this case, using at least one of a Speech To Text (STT) engine for converting a voice input into a character string or a Natural Language Processing (NLP) engine for acquiring intent information of a natural language, the processor 180 may acquire intent information corresponding to a user input.

In this case, at least one of the STT engine or the NLP engine may be partially composed of an ANN that is trained by a machine learning algorithm. In addition, at least one of the STT engine or the NLP engine may be trained by the learning processor 130, by the learning processor of the AI server, or distributed processing thereof.

The processor 180 may collect history information including details of an operation of the AI device 100 or a user's feedback on the operation, and store the collected history information in the memory 170 or the learning processor 130 or transmit the collected history information to an external device such as the AI server. The collected history information may be used to update a trained model.

In order to execute an application program stored in the memory, the processor 180 may control at least some elements of the AI device 100. Furthermore, in order to execute the application program, the processor 180 may operate a combination of two or more elements included in the AI device 100. The processor 180 may perform operations of the UE of the present specification or operations of the serving cell of the present specification.

When the AI device 100 is the UE in the present specification, the processor 180 may receive an SSB from the serving cell in a first interval using a first number of Rx beams and perform measurement based on the received SSB. In addition, the processor 180 may receive downlink data from the serving cell in a second interval using a second number of Rx beams. The first interval and the second interval may be included in an SMTC window duration and it may be considered that downlink data is not transmitted in a third interval in which the number of Rx beams is changed from the first number to the second number of from the second number to the first number.

When the AI device 100 is the serving cell in the present specification, the processor 180 may transmit an SSB to the UE in the first interval and transmit downlink data to the UE in the second interval. In addition, the processor 180 may transmit information related to SMTC and information related to the downlink data transmitted in the second interval to the UE.

In the above exemplary systems, although the methods have been described based on the flowcharts using a series of the steps or blocks, the present specification is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present specification.

What is claimed is:

1. A method for performing measurement by a wireless communication device, the method comprising:
receiving, from a serving cell, a synchronization signal (SS)/physical broadcast channel (PBCH) block (SSB) in a first interval by using a first number of reception (Rx) beams;
performing measurement based on the received SSB; and
receiving, from the serving cell, downlink data in a second interval by using a second number of Rx beams,
wherein the first interval and the second interval are included in an SSB based measurement timing configuration (SMTC) window duration, and
wherein the downlink data is considered to be not transmitted during a third interval, in which a number of Rx beams is changed from the first number to the second number or changed from the second number to the first number,
wherein the third interval is included in the SMTC window duration.

2. The method of claim 1, wherein the second number is greater than the first number.

3. The method of claim 1, wherein the downlink data is not scheduled by the serving cell in the third interval.

4. The method of claim 1, wherein a length of the third interval is one symbol or two symbols.

5. The method of claim 1, wherein the downlink data is transmitted from the serving cell based on an MCS index table related to a low modulation coding scheme (MCS) level when the second number is equal to the first number.

6. The method of claim 5, wherein the MCS index table related to a low MCS level includes an MCS index related to quadrature phase shift keying (QPSK) and an MCS index related to 16 quadrature amplitude modulation (QAM).

7. The method of claim 1, wherein the second number is equal to the first number when the second interval and the first interval overlap.

8. The method of claim 1, further comprising:
transmitting capability information about whether data in an active downlink bandwidth part (DL BWP) and a channel state information-reference signal (CSI-RS) having a different numerology from the data in the active DL BWP can be simultaneously received.

9. The method of claim 1, wherein the wireless communication device communicates with at least one of a network and a self-driving vehicle.

10. The method of claim 1, further comprising:
transmitting uplink data in the second interval using the second number of transmission (Tx) beams to the serving cell,
wherein the downlink data is transmitted from the serving cell based on an MCS index table related to a low MCS level when the second number is equal to the first number.

11. The method of claim 8, further comprising:
receiving, from the serving cell, information about a measurement gap with respect to the CSI-RS or information about a window with respect to the CSI-RS; and
receiving the CSI-RS based on the information about the measurement gap or the information about the window with respect to the CSI-RS,
wherein the capability information is used for the serving cell to set the CSI-RS such that the CSI-RS is transmitted in the measurement gap by controlling a period and an offset of the CSI-RS transmitted from the neighbor cell.

12. A wireless communication device performing measurement, comprising: a transceiver; and
a processor for controlling the transceiver, wherein the processor is configured:
to receive, from a serving cell, a synchronization signal (SS)/physical broadcast channel (PBCH) block (SSB) in a first interval by using a first number of reception (Rx) beams by controlling the transceiver;
to perform measurement based on the received SSB; and
to receive, from the serving cell, downlink data in a second interval by using a second number of Rx beams by controlling the transceiver,
wherein the first interval and the second interval are included in an SSB based measurement timing configuration (SMTC) window duration, and
wherein the downlink data is considered to be not transmitted during a third interval in which a number of Rx beams is changed from the first number to the second number or changed from the second number to the first number,
wherein the third interval is included in the SMTC window duration.

13. The wireless communication device of claim 12, wherein the second number is greater than the first number.

14. The wireless communication device of claim 12, wherein the downlink data is not scheduled by the serving cell in the third interval.

15. The wireless communication device of claim 12, wherein a length of the third interval is one symbol or two symbols.

16. The wireless communication device of claim 12, wherein the downlink data is transmitted from the serving cell based on an MCS index table related to a low modulation coding scheme (MCS) level when the downlink data is received using the first number of Rx beams in the second interval.

17. The wireless communication device of claim 15, wherein the MCS index table related to a low MCS level includes an MCS index related to quadrature phase shift keying (QPSK) and an MCS index related to 16 quadrature amplitude modulation (QAM).

18. The wireless communication device of claim of claim 12, wherein the downlink data is received using the first number of Rx beams in the second interval when the second interval and the first interval overlap.

19. The wireless communication device of claim of claim 12, wherein the processor is configured to:
transmit capability information about whether data in an active downlink bandwidth part (DL BWP) and a channel state information-reference signal (CSI-RS) having a different numerology from the data in the active DL BWP can be simultaneously received by controlling the transceiver.

20. A processor of a wireless communication device, the processor controlling the wireless communication device, wherein the processor is configured to:
receive, from a serving cell, a synchronization signal (SS)/physical broadcast channel (PBCH) block (SSB) in a first interval by using a first number of reception (Rx) beams by controlling the transceiver;
perform measurement based on the received SSB; and
receive, from the serving cell, downlink data in a second interval by using a second number of Rx beams greater than the first number,
wherein the first interval and the second interval are included in an SSB based measurement timing configuration (SMTC) window duration, and
wherein the downlink data is considered to be not transmitted in a third interval in which a number of Rx beams is changed from the first number to the second number or changed from the second number to the first number,
wherein the third interval is included in the SMTC window duration.

* * * * *